(12) United States Patent
Elenga et al.

(10) Patent No.: US 8,860,337 B2
(45) Date of Patent: Oct. 14, 2014

(54) LINEAR VIBRATION MODULES AND LINEAR-RESONANT VIBRATION MODULES

(75) Inventors: Robin Elenga, Seattle, WA (US); Brian Marc Pepin, Oakland, CA (US); Glen Tompkins, Woodinville, WA (US)

(73) Assignee: Resonant Systems, Inc., Seattle, WA (US)

( * ) Notice: Subject to any disclaimer, the term of this patent is extended or adjusted under 35 U.S.C. 154(b) by 322 days.

(21) Appl. No.: 13/345,607

(22) Filed: Jan. 6, 2012

(65) Prior Publication Data

US 2012/0133308 A1      May 31, 2012

Related U.S. Application Data

(63) Continuation-in-part of application No. 12/782,697, filed on May 18, 2010, now Pat. No. 8,093,767.

(60) Provisional application No. 61/179,109, filed on May 18, 2009.

(51) Int. Cl.
  *H02K 33/00*   (2006.01)
  *H02K 33/16*   (2006.01)

(52) U.S. Cl.
  CPC ..................................... *H02K 33/16* (2013.01)
  USPC ........................... 318/128; 318/129; 318/114

(58) Field of Classification Search
  USPC ........ 318/128, 129, 114; 310/19, 36, 254, 17; 340/407.1
  See application file for complete search history.

(56) References Cited

U.S. PATENT DOCUMENTS

| | | |
|---|---|---|
| 1,120,414 A | 12/1914 | Schoolfield et al. |
| 3,728,654 A | 4/1973 | Tada |
| 4,549,535 A | 10/1985 | Wing |
| 4,692,999 A | 9/1987 | Frandsen |
| 5,017,819 A | 5/1991 | Patt et al. |
| 5,187,398 A | 2/1993 | Stuart et al. |
| 5,231,336 A | 7/1993 | van Namen |
| 5,231,337 A | 7/1993 | van Namen |
| 5,424,592 A | 6/1995 | Bluen et al. |
| 5,896,076 A | 4/1999 | van Namen |
| 5,955,799 A * | 9/1999 | Amaya et al. .................. 310/36 |
| 5,973,422 A | 10/1999 | Clamme |
| 6,323,568 B1 * | 11/2001 | Zabar ............................. 310/17 |
| 6,326,706 B1 | 12/2001 | Zhang |
| 7,449,803 B2 | 11/2008 | Sahyoun |
| 7,474,018 B2 | 1/2009 | Shimizu et al. |
| 7,768,160 B1 | 8/2010 | Sahyoun |
| 7,768,168 B2 | 8/2010 | Aschoff et al. |
| 7,771,348 B2 | 8/2010 | Madsen et al. |

(Continued)

FOREIGN PATENT DOCUMENTS

EP      1 376 833 A1      1/2004

*Primary Examiner* — Karen Masih
(74) *Attorney, Agent, or Firm* — Olympic Patent Works, PLLC

(57) ABSTRACT

The current application is directed to various types of linear vibrational modules, including linear-resonant vibration modules, that can be incorporated in a wide variety of appliances, devices, and systems to provide vibrational forces. The vibrational forces are produced by linear oscillation of a weight or member, in turn produced by rapidly alternating the polarity of one or more driving electromagnets. Feedback control is used to maintain the vibrational frequency of linear-resonant vibration module at or near the resonant frequency for the linear-resonant vibration module. Both linear vibration modules and linear-resonant vibration modules can be designed to produce vibrational amplitude/frequency combinations throughout a large region of amplitude/frequency space.

5 Claims, 20 Drawing Sheets

(56) References Cited

U.S. PATENT DOCUMENTS

| | | |
|---|---|---|
| 7,859,144 B1 | 12/2010 | Sahyoun |
| 2004/0055598 A1* | 3/2004 | Crowder et al. ......... 128/203.15 |
| 2005/0231045 A1* | 10/2005 | Oba et al. ........................ 310/19 |
| 2005/0275508 A1* | 12/2005 | Orr et al. ..................... 340/407.1 |
| 2006/0138875 A1* | 6/2006 | Kim et al. ....................... 310/15 |
| 2006/0208600 A1* | 9/2006 | Sahyoun ....................... 310/254 |
| 2011/0144426 A1 | 6/2011 | Blenk et al. |
| 2011/0248817 A1* | 10/2011 | Houston et al. ................. 340/4.2 |
| 2012/0212895 A1* | 8/2012 | Cohen et al. ............. 361/679.02 |

\* cited by examiner

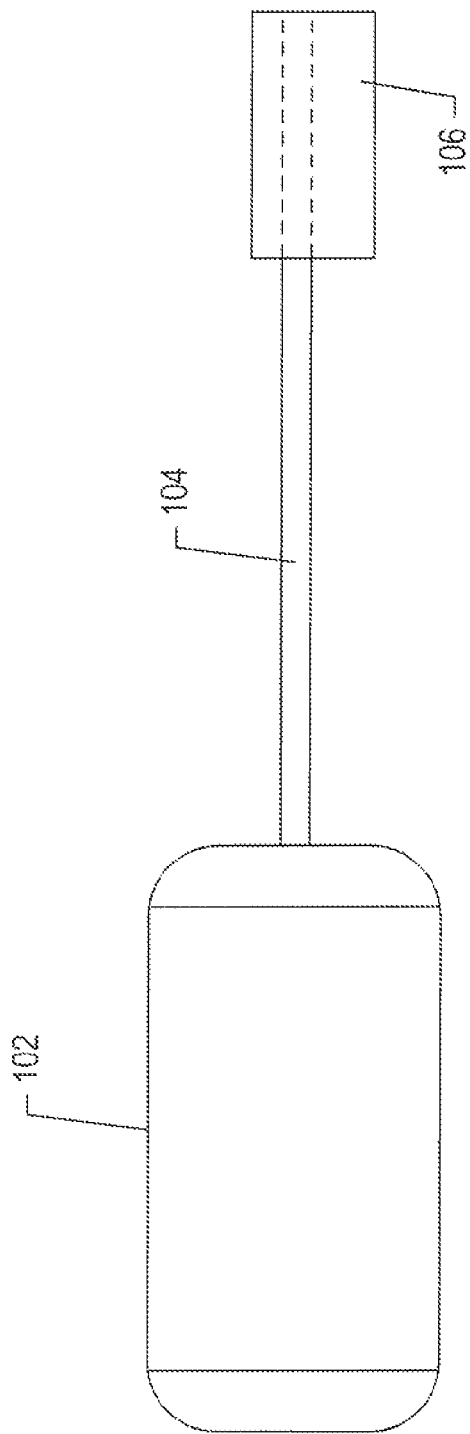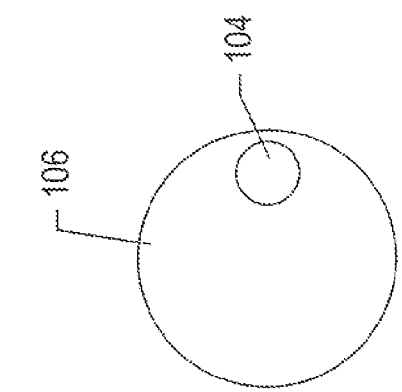
FIG. 1A
--Prior Art--
FIG. 1B
--Prior Art--

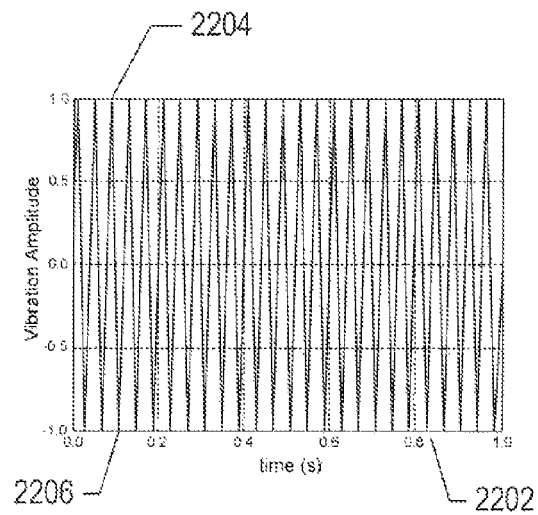
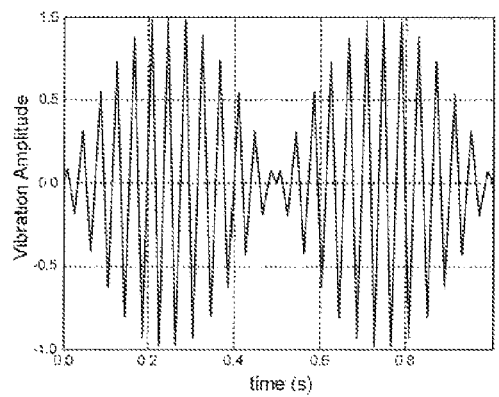
FIG. 22A                FIG. 22B
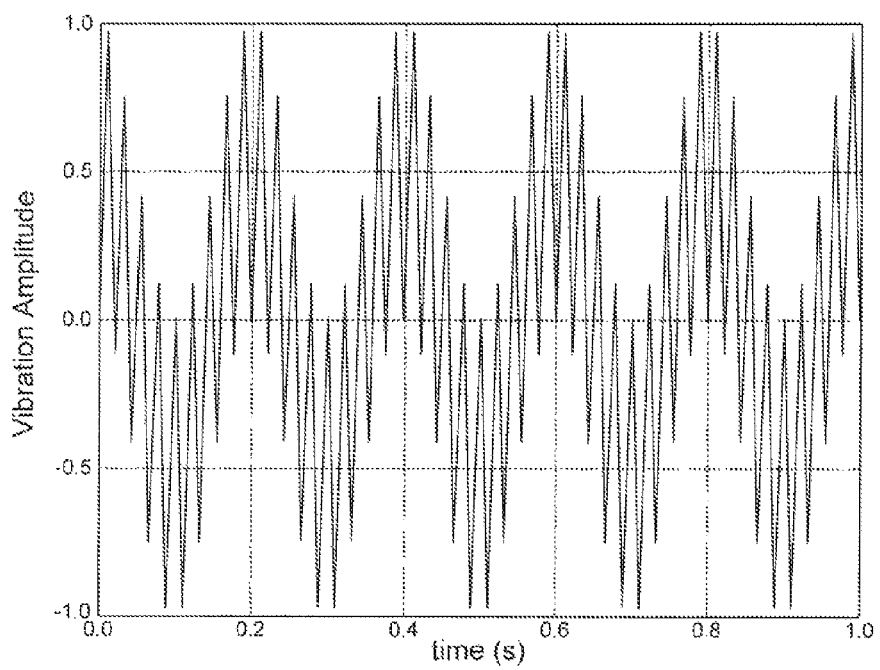
FIG. 23

LINEAR VIBRATION MODULES AND LINEAR-RESONANT VIBRATION MODULES

CROSS-REFERENCE TO RELATED APPLICATIONS

This application is a continuation-in-part of application Ser. No. 12/782,697, filed May 18, 2010 now U.S. Pat. No. 8,093,767, which claims the benefit of Provisional Patent Application No. 61/179,109, filed May 18, 2009.

TECHNICAL FIELD

The current application is related to vibration-generating devices and, in particular, to vibration modules that can be incorporated into a wide variety of different types of electromechanical devices and systems to produce vibrations of selected amplitudes and frequencies over a wide range of amplitude/frequency space.

BACKGROUND

Vibration-inducing motors and mechanisms have been used for many years in a wide variety of different consumer appliances, toys, and other devices and systems. Examples include vibration signals generated by pagers, vibration-driven appliances, such as hair-trimming appliances, electric toothbrushes, electric toy football games, and many other appliances, devices, and systems. The most common electromechanical system used for generating vibrations is an intentionally unbalanced electric motor.

FIGS. 1A-B illustrate an unbalanced electric motor typically used for generating vibrations in a wide variety of different devices. As shown in FIG. 1A, a small, relatively low-power electric motor 102 rotates a cylindrical shaft 104 onto which a weight 106 is asymmetrically or mounted. FIG. 1B shows the weight asymmetrically mounted to the shaft, looking down at the weight and shaft in the direction of the axis of the shaft. As shown in FIG. 1B, the weight 106 is mounted off-center on the electric-motor shaft 104. FIGS. 2A-B illustrate the vibrational motion produced by the unbalanced electric motor shown in FIGS. 1A-B. As shown in FIGS. 2A-B, the asymmetrically-mounted weight creates an elliptical oscillation of the end of the shaft, normal to the shaft axis, when the shaft is rotated at relatively high speed by the electric motor. FIG. 2A shows displacement of the weight and shaft from the stationary shaft axis as the shaft is rotated, looking down on the weight and shaft along the shaft axis, as in FIG. 1B. In FIG. 2A, a small mark 202 is provided at the periphery of the disk-shaped end the of electric-motor shaft to illustrate rotation of the shaft. When the shaft rotates at high speed, a point 204 on the edge of the weight traces an ellipsoid 206 and the center of the shaft 208 traces a narrower and smaller ellipsoid 210. Were the shaft balanced, the center of the shaft would remain at a position 212 in the center of the diagram during rotation, but the presence of the asymmetrically-mounted weight attached to the shaft, as well as other geometric and weight-distribution characteristics of the electric motor, shaft, and unbalanced weight together create forces that move the end of the shaft along the elliptical path 210 when the shaft is rotated at relatively high speed. The movement can be characterized, as shown in FIG. 2B, by a major axis 220 and minor axis 222. of vibration, with the direction of the major axis of vibration equal to the direction of the major axis of the ellipsoids, shown in FIG. 2A, and the length of the major axis corresponding to the amplitude of vibration in this direction. In many applications, in which a linear oscillation is desired, designers seek to force the major-axis-amplitude/minor-axis-amplitude ratio to be as large as possible, but, because the vibration is produced by a rotational force, it is generally not possible to achieve linear oscillation. In many cases, the path traced by the shaft center may be close to circular. The frequency of vibration of the unbalanced electric motor is equal to the rotational frequency of the electric-motor shaft, and is therefore constrained by the rate at which the motor can rotate the shaft. At low rotational speeds, little vibration is produced.

While effective in producing vibrations, there are many problems associated with the unbalanced-electric-motor vibration-generating units, such as that shown in FIG. 1A, commonly used in the various devices, systems, and applications discussed above. First, unbalancing the shaft of an electric motor not only produces useful vibrations that can be harnessed for various applications, but also produces destructive, unbalanced forces within the motor that contribute to rapid deterioration of motor parts. Enormous care and effort is undertaken to precisely balance rotating parts of motors, vehicles, and other types of machinery, and the consequences of unbalanced rotating parts are well known to anyone, familiar with automobiles, machine tools, and other such devices and systems. The useful lifetimes of many devices and appliances, particularly hand-held devices and appliances, that employ unbalanced electric motors for generating vibrations may range from a few tens of hours to a few thousands of hours of use, after which the vibrational amplitude produced by the devices declines precipitously as the electric motor and other parts deteriorate.

A second problem with unbalanced electric motors is that they are relatively inefficient at producing vibrational motion. A far greater amount of power is consumed by an unbalanced electrical motor to produce a given vibrational force than the theoretical minimum power required to produce the given vibrational force. As a result, many hand-held devices that employ unbalanced electric motors for generating vibrations quickly consume batteries during use.

A third problem with unbalanced electric motors, discussed above, is that they generally produce elliptical vibrational modes. Although such modes may be useful in particular applications, many applications can better use a linear oscillation, with greater directional concentration of vibrational forces. Linear oscillation cannot generally be produced by unbalanced electric motors.

A fourth, and perhaps most fundamental, problem associated with using unbalanced electric motors to generate vibrations is that only a very limited portion of the total vibrational-force/frequency space is accessible to unbalanced electric motors. FIG. 3 shows a graph of vibrational force with respect to frequency for various types of unbalanced electric motors. The graph is shown as a continuous hypothetical curve, although, of course, actual data would be discrete. As shown in FIG. 3, for relatively low-power electric motors used in hand-held appliances, only a fairly narrow range of frequencies centered about 80 Hz (302 in FIG. 3) generate a significant vibrational force. Moreover, the vibrational force is relatively modest. The bulk of energy consumed by an unbalanced electric motor is used to spin the shaft and unbalanced weight and to overcome frictional and inertial forces within the motor. Only a relatively small portion of the consumed energy is translated into desired vibrational forces.

Because of the above-discussed disadvantages with the commonly employed unbalanced-electric-motor vibration-generation units, designers, manufacturers, and, ultimately, users of a wide variety of different vibration-based devices, appliances, and systems continue to seek more efficient and capable vibration-generating units for incorporation into many consumer appliances, devices, and systems.

SUMMARY

The current application is directed to various types of linear vibrational modules, including linear-resonant vibration modules, that can be incorporated in a wide variety of appliances, devices, and systems to provide vibrational forces. The vibrational forces are produced by linear oscillation of a weight or member, in turn produced by rapidly alternating the polarity of one or more driving electromagnets. Feedback control is used to maintain the vibrational frequency of linear-resonant vibration module at or near the resonant frequency for the linear-resonant vibration module. Both linear vibration modules and linear-resonant vibration modules can be designed to produce vibrational amplitude/frequency combinations throughout a large region of amplitude/frequency space.

BRIEF DESCRIPTION OF THE DRAWINGS

FIGS. 1A-B illustrate an unbalanced electric motor typically used for generating vibrations in a wide variety of different devices.

FIGS. 22A-23 illustrate interesting vibrational modes produced by driving a linear-resonant vibration module simultaneously at two different frequencies.

DETAILED DESCRIPTION

Figure 2A:
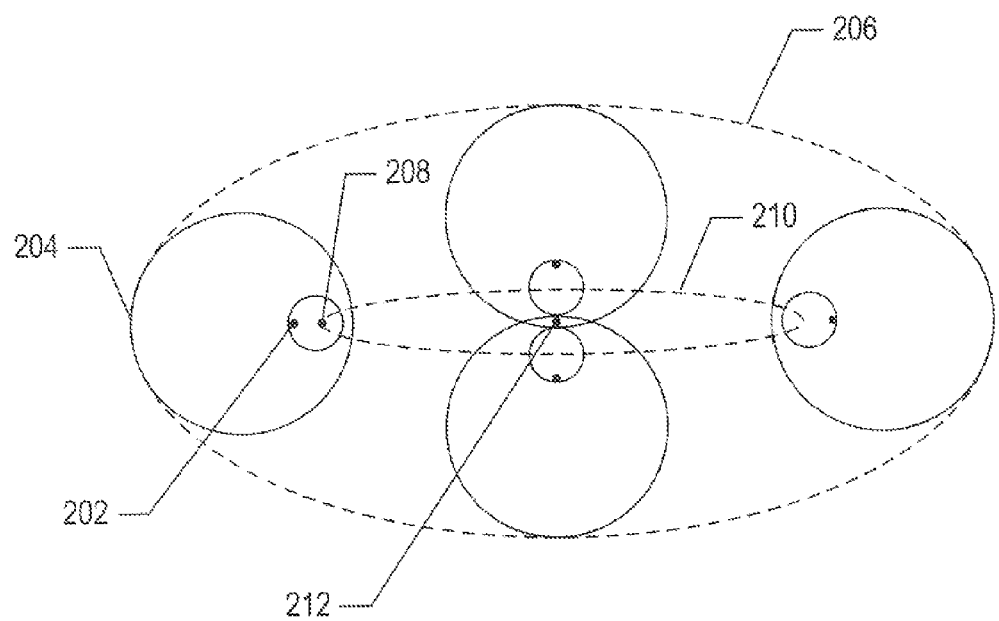
FIGS. 2A-B illustrate the vibrational motion produced by the unbalanced electric motor shown in FIGS. 1A-B.
Figure 2B:
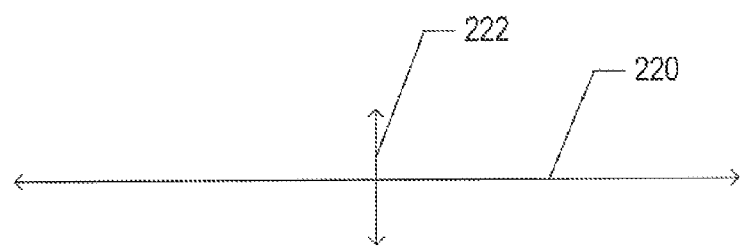

The current application is directed to various linear vibration modules ("LRMs"), including various types of linear-resonant vibration modules ("LRVMs"), that can be used within a wide variety of different types of appliances, devices, and systems, to generate vibrational forces. The LVMs and LRVMs that represent embodiments of the current application are linear in the sense that the vibrational forces are produced by a linear oscillation of a weight or component within the LVM or LRVM, rather than as a by-product of an unbalanced rotation, as in the case of currently employed unbalanced electric motors. The linear nature of the LRVM vibration-inducing motion allows the problems associated with unbalanced-electric-motor vibrators, discussed above, to be effectively addressed. An oscillating linear motion does not produce destructive forces that quickly degrade and wear out an unbalanced electric motor. A linearly oscillating mechanism is characterized by parameters that can be straightforwardly varied in order to produce vibrations of a desired amplitude and frequency over a very broad region of amplitude/frequency space. In many implementations of LRVMs and LVMs, the vibration amplitude and vibration frequency can be independently controlled by a user through user-input features, including buttons, sliders, and other types of user-input features. Combining a linearly oscillating vibration-inducing mechanism with feedback control, so that the frequency of vibration falls close to the resonant frequency of the LRVM, results in optimal power consumption with respect to the amplitude and frequency of vibration produced by the LRVM. Clearly, linear oscillation within a LRVM translates into highly direction vibrational forces produced by an appliance or device that incorporates the LRVM.

FIGS. 4A-G illustrate one particular LRVM, and operation of the particular LRVM, that represents one implementation of the linear-resonant vibration module to which current application is directed. FIGS. 4A-G all use the same illustration conventions, next discussed with reference to FIG. 4A. The LRVM includes a cylindrical housing 402 within which a solid, cylindrical mass 404, or weight, can move linearly along the inner, hollow, cylindrically shaped chamber 406 within the cylindrical housing or tube 402. The weight is a magnet, in the described an implementation of the linear-resonant vibration module to which current application is directed, with polarity indicated by the "+" sign 410 on the right-hand end and the "−" sign 412 on the left-hand end of the weight 404. The cylindrical chamber 406 is capped by two magnetic disks 414 and 416 with polarities indicated by the "+" sign 418 and the "−" sign 419. The disk-like magnets 414 and 418 are magnetically oriented opposite from the magnetic orientation of the weight 404, so that when the weight moves to either the extreme left or extreme right sides of the cylindrical chamber, the weight is repelled by one of the disk-like magnets at the left or right ends of the cylindrical chamber. In other words, the disk-like magnets act much like springs, to facilitate deceleration and reversal of direction of motion of the weight and to minimize or prevent mechanicalimpact forces of the weight and the end caps that close off the cylindrical chamber. Finally, a coil of conductive wire 420 girdles the cylindrical housing, or tube 402 at approximately the mid-point of the cylindrical housing.

Figure 4A:
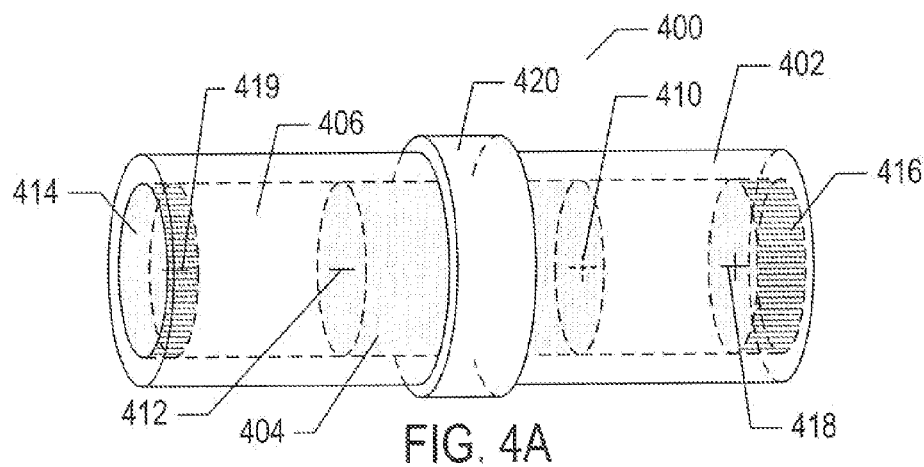
FIGS. 4A-G illustrate one particular LRVM, and operation of the particular LRVM, that represents one implementation of the linear-resonant vibration module to which current application is directed.
Figure 4B:
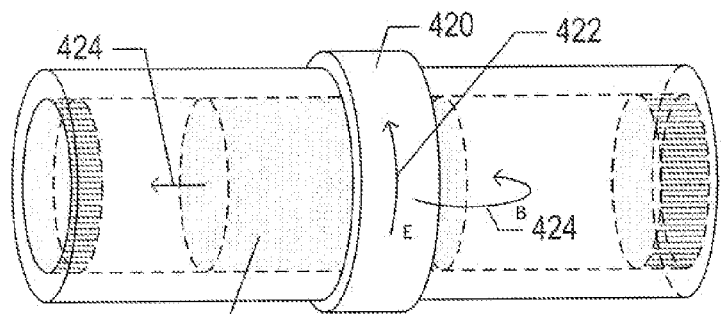
Figure 4C:
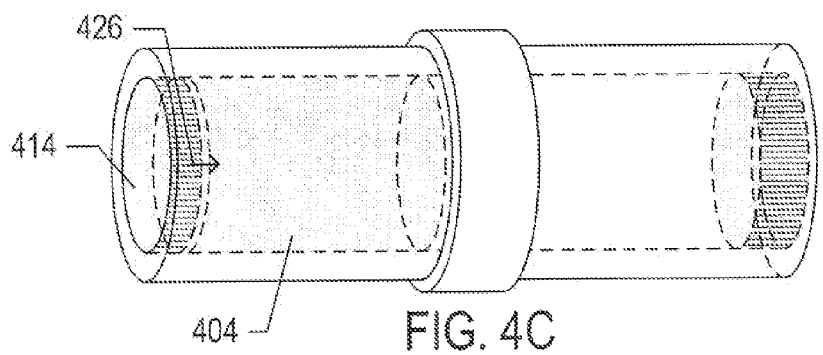
Figure 4D:
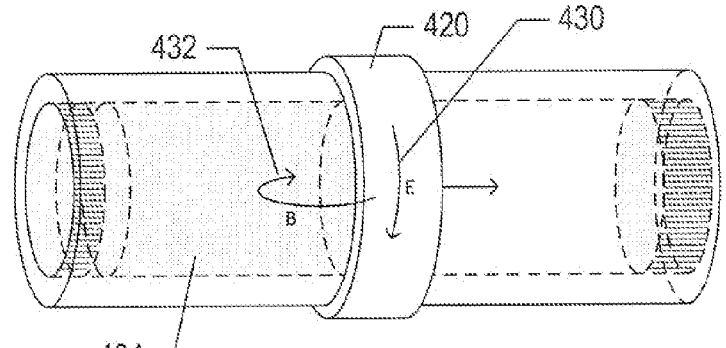
Figure 4E:
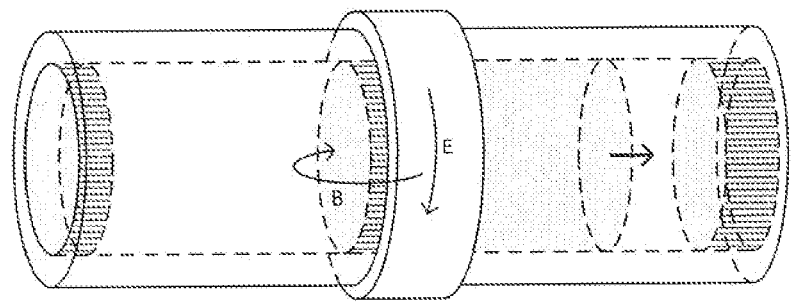
Figure 4F:
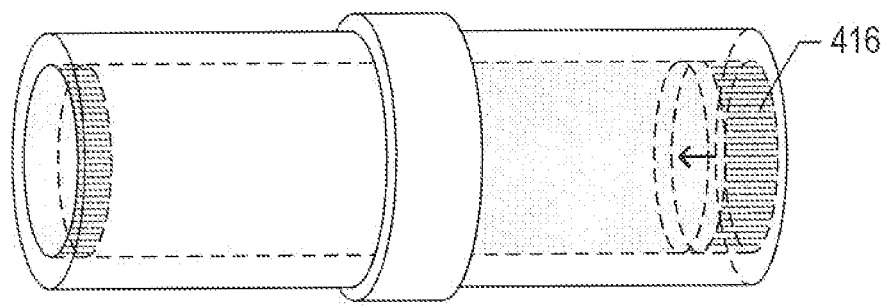
Figure 4G:
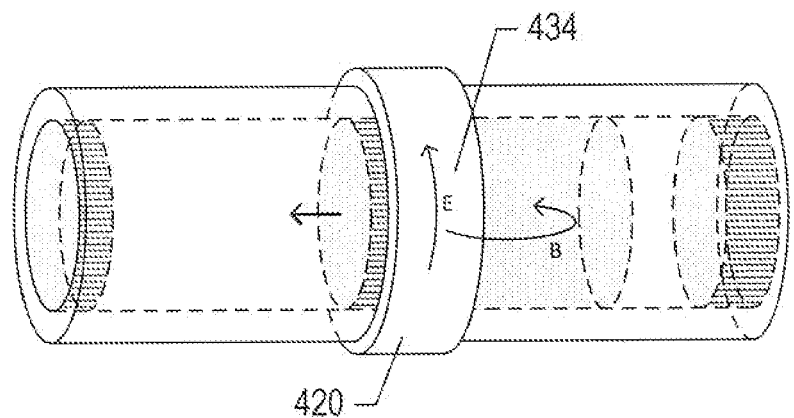

FIGS. 4B-G illustrate operation of the LRVM shown in FIG. 4A. When an electric current is applied to the coil 420 in a first direction 422, a corresponding magnetic force 424 is generated in a direction parallel to the axis of the cylindrical chamber, which accelerates. the weight 404. in the direction of the magnetic force 424. When the weight reaches a point at or close to the corresponding disk-like magnet 414, as shown in FIG. 4C, a magnetic force due to the repulsion of the disk-like magnet 414 and the weight 404, 426, is generated in the opposite direction, decelerating the weight and reversing its direction. As the weight reverses direction, as shown in FIG. 4D, current is applied in an opposite direction 430 to the coil 420, producing a magnetic force 432 in an opposite direction from the direction of the magnetic force shown in FIG. 4B, which accelerates the weight 404 in a direction opposite to the direction in which the weight is accelerated in FIG. 4B. As shown in FIG. 4E, the weight then moves rightward until, as shown in FIG. 4F, the weight is decelerated, stopped, and then accelerated in the opposite direction by repulsion of the disk-like magnet 416. An electrical current is then applied to the coil 420 in the same direction 434 as in FIG. 4B, again accelerating the solid cylindrical mass in the same direction as in FIG. 4B. Thus, by a combination of a magnetic field with rapidly reversing polarity, generated by alternating the direction of current applied to the coil, and by the repulsive forces between the weight magnet and the disk-like magnets at each end of the hollow, cylindrical chamber, the weight linearly oscillates back and forth within the cylindrical housing 402, imparting a directional force at the ends of the cylindrical chamber with each reversal in direction.

Clearly, the amplitude of the vibration and vibrational forces produced are related to the length of the hollow chamber in which the weight oscillates, the current applied to the coil, the mass of the weight, the acceleration of the weight produced by the coil, and the mass of the entire LRVM. All of these parameters are essentially design parameters for the LRVM, and thus the LRVM can be designed to produce a wide variety of different amplitudes.

Figure 5B:
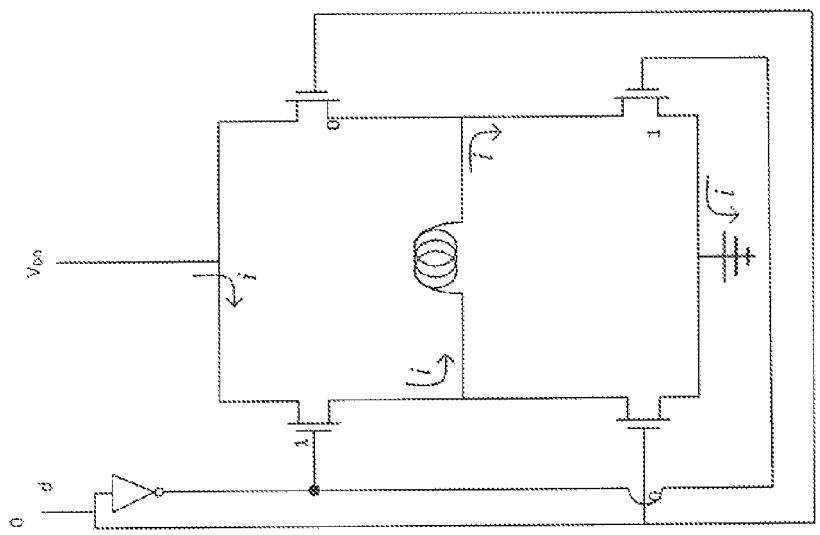
FIGS. 5A-B illustrate an H-bridge switch that can be used, in various embodiments of the current application, to change the direction of current applied to the coil that drives linear oscillation within a linear-resonance vibration module ("LRVM").
Figure 5A:
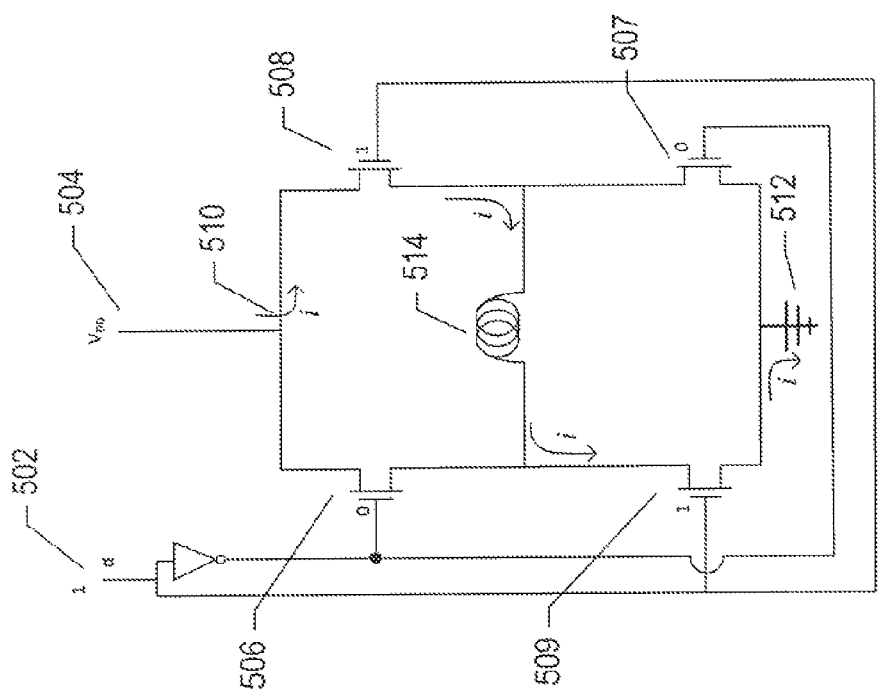

The frequency of the oscillation of the solid, cylindrical mass is determined by the frequency at which the direction of the current applied to the coil is changed. FIGS. 5A-B illustrate an H-bridge switch that can be used, in various embodiments of the current application, to change the direction of current applied to the coil that drives linear oscillation within an LRVM. FIGS. 5A-B both use the same illustration conventions, described next with respect to FIG. 5A. The H-bridge switch receives, as input, a directional signal d 502 and direct-current ("DC") power 504. The direction-control signal d 502 controls four switches 506-509, shown as transistors in FIG. 5A. When the input control signal d 502 is high, or "1," as shown in FIG. 5A, switches 508 and 509 are closed and switches 506 and 507 are open, and therefore current flows, as indicated by curved arrows, such as curved arrow 510, from the power-source input 504 to ground 512 in a leftward direction through the coil 514. When the input-control signal d is low, or "0," as shown in FIG. 5B,. the direction of the current through the coil is reversed. The H-bridge switch, shown in FIGS. 5A-B, is but one example of various different types of electrical and electromechanical switches that can be used to rapidly alternate the direction of current within the coil of an LRVM.

Figure 6:
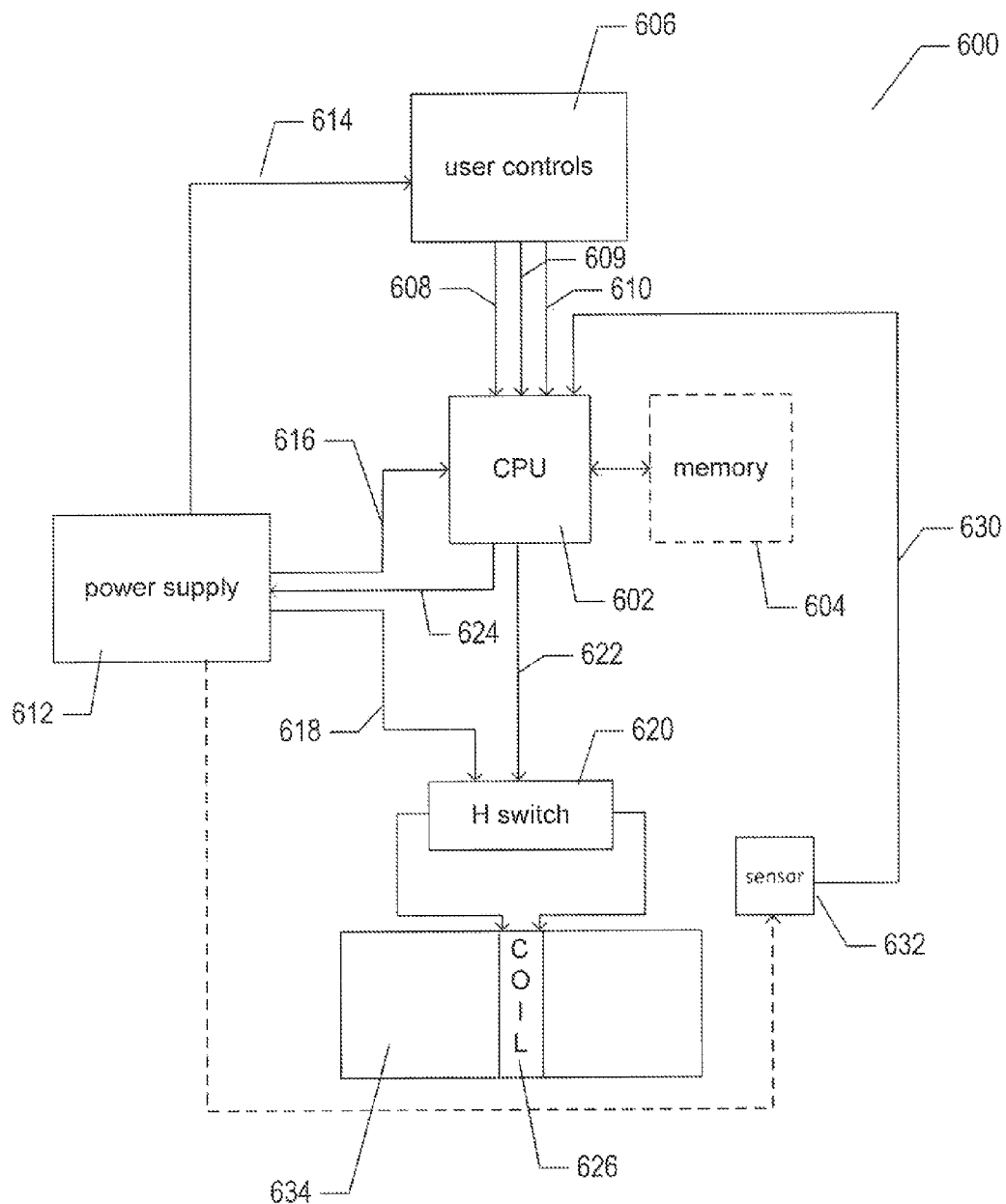
FIG. 6 provides a block diagram of the LRVM, illustrated in FIGS. 4A-G, that represents one implementation of the linear-resonant vibration module to which current application is directed.

FIG. 6 provides a block diagram of the LRVM, illustrated in FIGS. 4A-G, that represents one implementation of the linear-resonant vibration module to which current application is directed. The LRVM, in addition to the cylindrical housing, coil, and internal components shown in FIG. 4A, includes a power supply, a user interface, generally comprising electromechanical buttons or switches, the H-bridge switch, discussed above with reference to FIGS. 5A-B, a central processing unit ("CPU"), generally a small, low-powered microprocessor, and one or more electromechanical sensors. All of these components are packaged together as an LRVM within a vibration-based appliance, device, or system.

As shown in FIG. 6, the LRVM 600 is controlled by a control program executed by the CPU microprocessor 602. The microprocessor may contain sufficient on-board. memory to store the control program and other values needed during execution of the control program, or, alternatively, may be coupled to a low-powered memory chip 604 or flash memory for storing the control program. The CPU receives inputs from the user controls 606 that together comprise a user interface. These controls may include any of various dials, pushbuttons, switches, or other electromechanical-control devices. As one example, the user controls may include. a dial to select a strength of vibration, which corresponds to the current applied to the coil, a switch to select one of various different operational modes, and a power button. The user controls generate signals input to the CPU 608-610. A power supply 612 provides power, as needed, to user controls 614, to the CPU 616 and optional, associated memory, to the H-bridge switch 618, and, when needed, to one or more sensors 632. The voltage and current supplied by the power supply to the various components may vary, depending on the operational characteristics and requirements of the components. The H-bridge switch 620 receives a control-signal input d 622 from the CPU. The power supply 612 receives a control input 624 from the CPU to control the current supplied to the H-bridge switch 618 for transfer to the coil 626. The CPU receives input 630 from one or more electromechanical sensors 632 that generate a signal corresponding to the strength of vibration currently being produced by the linearly oscillating mass 634. Sensors may include one or more of accelerometers, piezoelectric devices, pressure-sensing devices, or other types of sensors that can generate signals corresponding to the strength of desired vibrational forces.

Figure 7A:
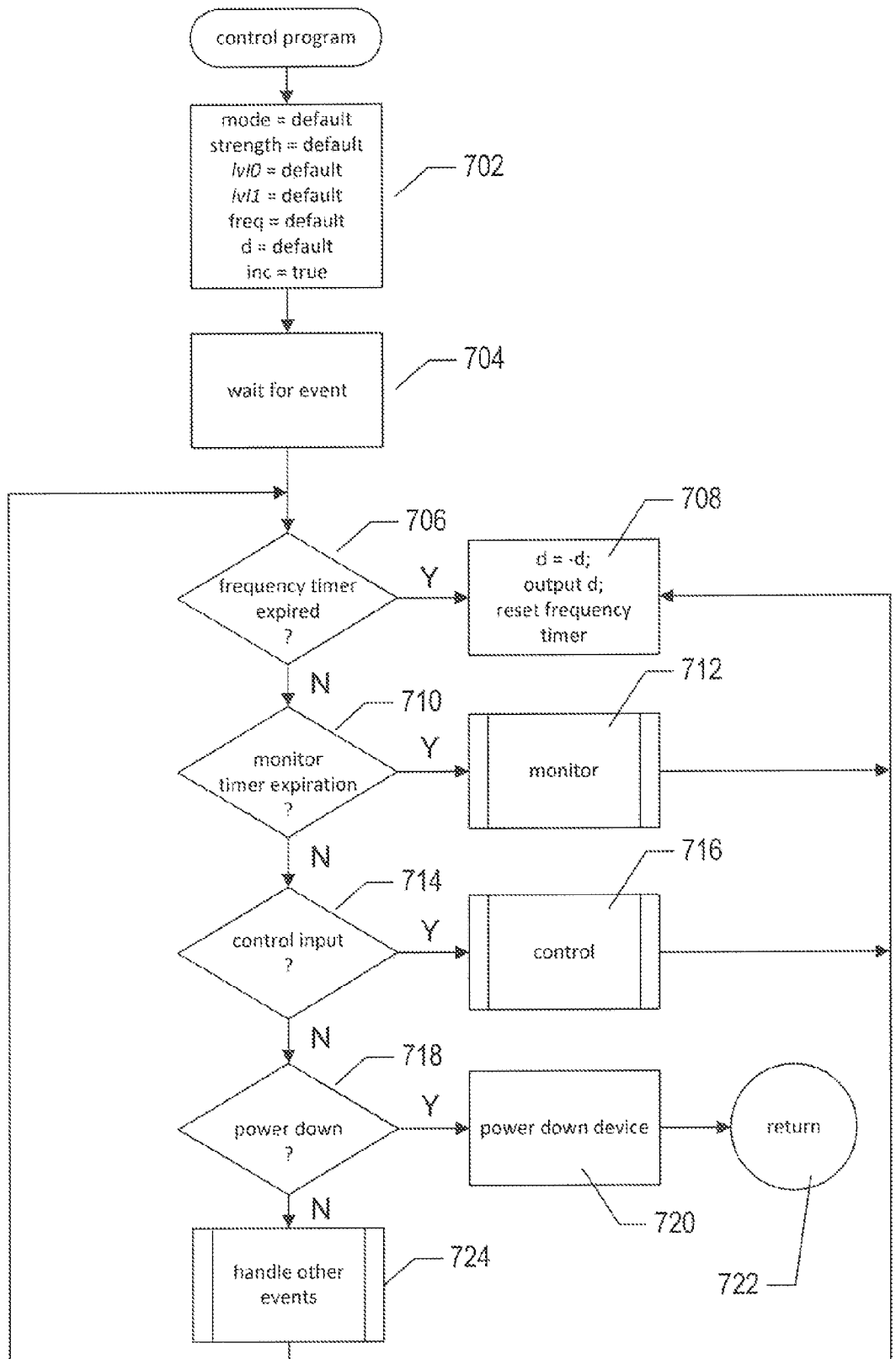
FIGS. 7A-C provide control-flow diagrams that illustrate the control program, executed by the CPU, that controls operation of an LRVM that represents one implementation of the linear-resonant vibration module to which current application is directed.
Figure 7B:
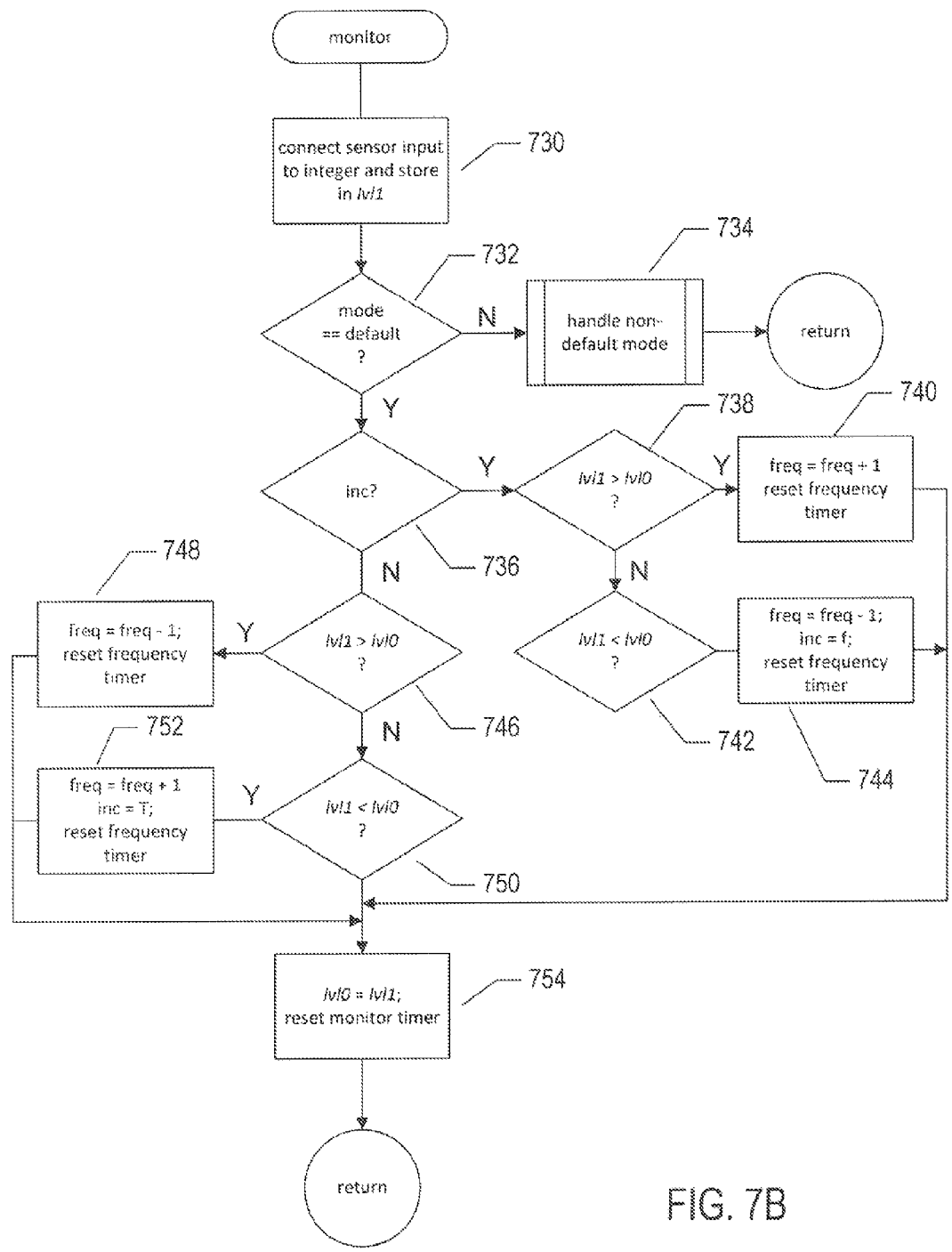
Figure 7C:
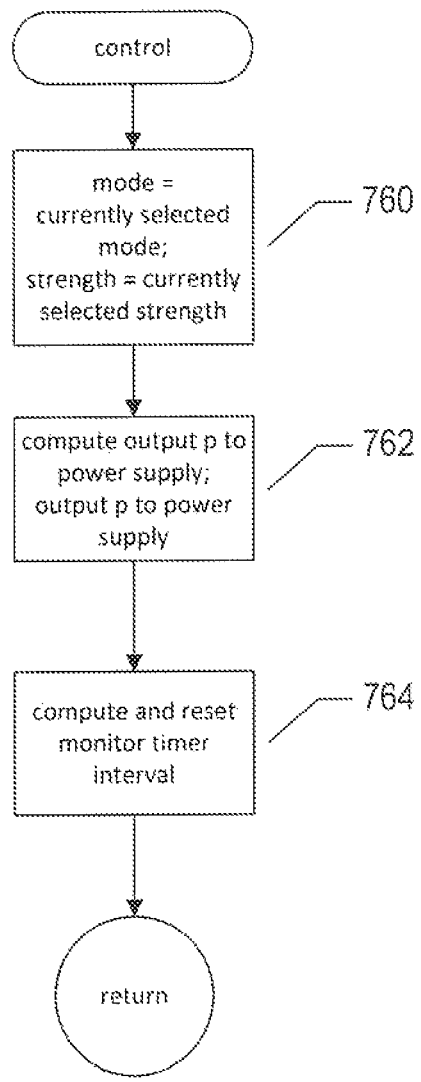

FIGS. 7A-C provide control-flow diagrams that illustrate the control program, executed by the CPU, that controls operation of an LRVM that represents one implementation of the linear-resonant vibration module to which current application is directed. FIG. 7A provides a control flow diagram for the high-level control program. The program begins execution, in step 702, upon a power-on event invoked by a user through a power button or other user control. In step 702, various local variables are set to default values, including the variables: (1) mode, which indicates the current operational mode of the device; (2) strength, a numerical value corresponding to the current user-selected strength of operation, corresponding to the electrical current applied to the coil; (3) lvl0, a previously sensed vibrational strength; (4) lvl1, a currently sensed vibrational strength; (5) freq, the current frequency at which the direction of current is alternated in the coil; (6) d, the control output to the H-bridge switch; and (7) inc, a Boolean value that indicates that the frequency is currently being increased. Next, in step 704, the control program waits for a next event. The remaining steps represent a continuously executing loop, or event handler, in which each event that occurs is appropriately handled by the control program. In certain implementations of the control program, events may be initiated by interrupt-like mechanisms and stacked for execution while, in more primitive implementations, certain events that overlap in time may be ignored or dropped. In the implementation illustrated in FIGS. 7A-C, two timers are used, one for controlling the change in direction of the current applied to the coil, at a currently established frequency, and the other for controlling a monitoring interval at which the control program monitors the vibrational force currently produced. Rather than using a formal timer mechanism, certain implementations may simply employ counted loops or other simple programming techniques for periodically carrying out tasks. When an event occurs, the control program begins a series of tasks, the first of which is represented by the conditional step 706, to determine what event has occurred and appropriately handle that event. When the frequency timer has expired, as determined in step 706, the value of the output signal d is flipped, in step 708, and output to the H-bridge switch, with the frequency timer being reset to trigger a next frequency-related event. The frequency-timer interval is determined by the current value of the variable freq. Otherwise, when the event is a monitor timer expiration event, as determined in step 710, then a routine "monitor" is called in step 712. Otherwise, when the event corresponds to a change in the user input through the user interface, as determined in step 714, the routine "control" is called in step 716. Otherwise, when the event is a power-down event, as determined in step 718, resulting from deactivation of a power button by the user, then the control program appropriately powers down the device, in step 720, and the control program terminates in step 722. Any other of various types of events that may occur are handled by a default event handler 724. These events may include various error conditions that arise during operation of the device.

FIG. 7B provides a control-flow diagram for the routine "monitor," called in step 712 of FIG. 7A. In step 730, the routine "monitor" converts the sensor input to an integer representing the current vibrational force produced by the LRVM and stores the integer value in the variable lvl1. Next, in step 732, the routine "monitor" determines whether or not the LRVM is currently operating in the default mode. In the default mode, the LRVM uses continuous feedback control to optimize the vibrational force produced by the LRVM by continuously seeking to operate the LRVM at a frequency as close as possible to the resonant frequency for the LRVM. Other, more complex operational modes may be handled by various more complex routines, represented by step 734 in FIG. 7B. More complex vibrational modes may systematically and/or periodically alter the frequency or produce various complex, multi-component vibrational modes useful in certain applications, appliances, devices, and systems. These more complex modes are application dependent, and are not further described in the control-flow diagrams. In the case that the operational mode is the default mode, in which the, control program seeks to optimize the vibrational force generated by the device, in step 736, the routine "monitor" determines whether the local variable inc is set to TRUE. if so, then the control program is currently increasing the frequency at which the device operates in order to obtain the resonance frequency. When lvl1 is greater than lvl0, as determined in step 738, then the vibrational force has been recently increased by increasing the frequency, and so the routine "monitor" increases the frequency again, in step 740, and correspondingly resets the frequency timer. Otherwise, when lvl1 is less than lvl0, as determined in step 742, then the control program has increased the frequency past the resonance frequency, and therefore, in step 744, the control program decreases the frequency, sets the variable inc to FALSE, and correspondingly resets the frequency timer. In similar fashion, when the variable inc is initially FALSE, as determined in step 736, and when lvl1 is greater than lvl0, as determined in step 746, the routine "monitor" decreases the value stored in the variable freq, in step 748 and resets the frequency timer. Otherwise, when lvl1 is less than lvl0, as determined in step 750, then the routine "monitor" increases the value stored in the variable freq, sets the variable inc to TRUE, and resets the frequency timer in step 752. Finally, the value in lvl1 is transferred to lvl0 and the monitor timer is reset, in step 754.

FIG. 7C provides a control-flow diagram for the routine "control," called in step 716 in FIG. 7A. This routine is invoked when a change in the user controls has occurred. In step 760, the variables mode and strength are set to the currently selected mode and vibrational strength, represented by the current states of control features in the user interface. Next, in step 762, the routine "control" computes an output value p corresponding to the currently selected strength, stored in the variable strength, and outputs the value p to the power supply so that the power supply outputs an appropriate current to the coil. Finally, in step 764, the routine "control" computes a new monitor timer interval and resets the monitor timer accordingly.

The control program described with reference to FIGS. 7A-C is one example of many different implementations of the-control program that can be carried out, depending on requirements of the LRVM, the parameters and characteristics inherent in a particular LRVM, the types of control inputs received from a particular user interface, the nature of the power supply, and the types of operational modes that are implemented for the LRVM.

Figure 3:
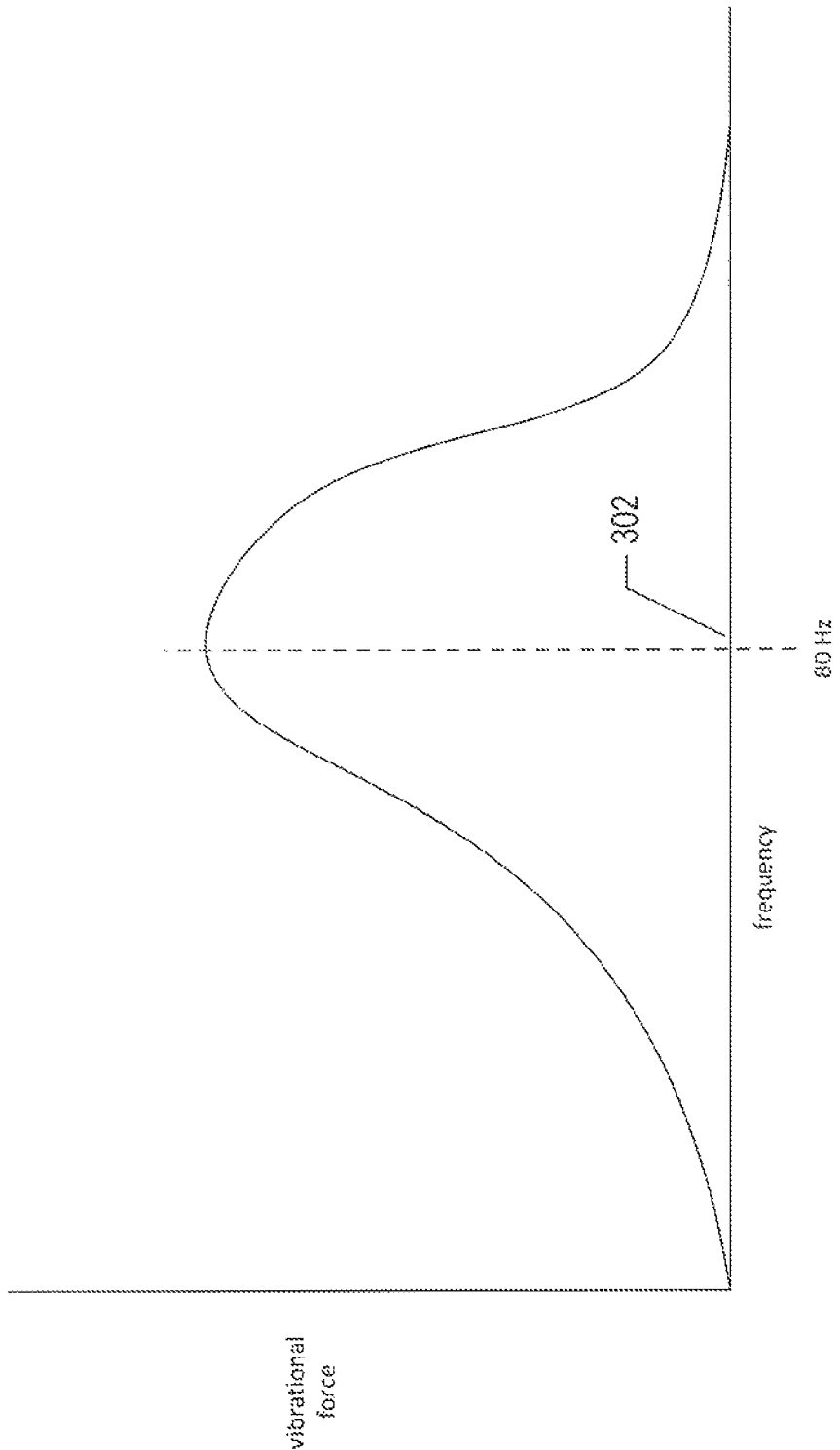
FIG. 3 shows a graph of vibrational force with respect to frequency for various types of unbalanced electric motors.
Figure 8:
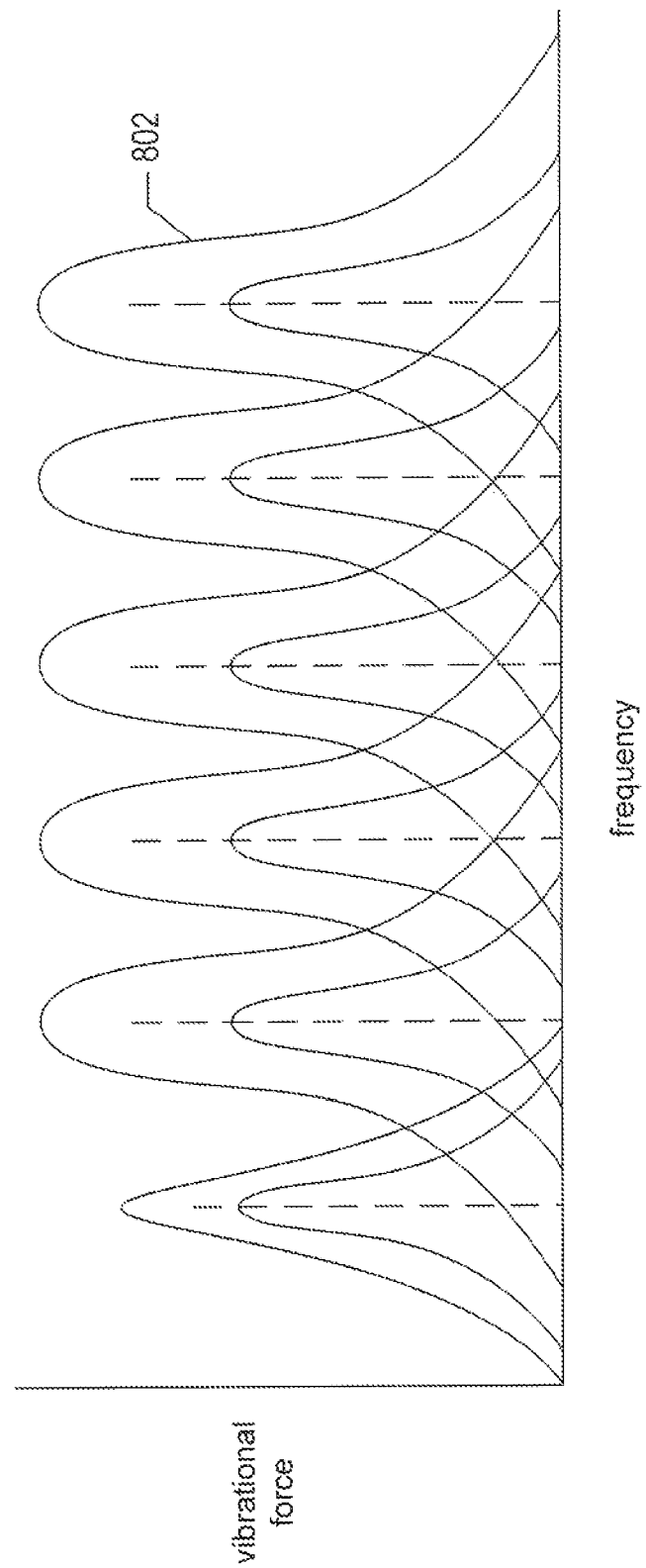
FIG. 8 represents the range of frequencies and vibrational forces that can be achieved by different implementations of LRVM and LRVM control programs that represent embodiments of the current application.
Figure 9:
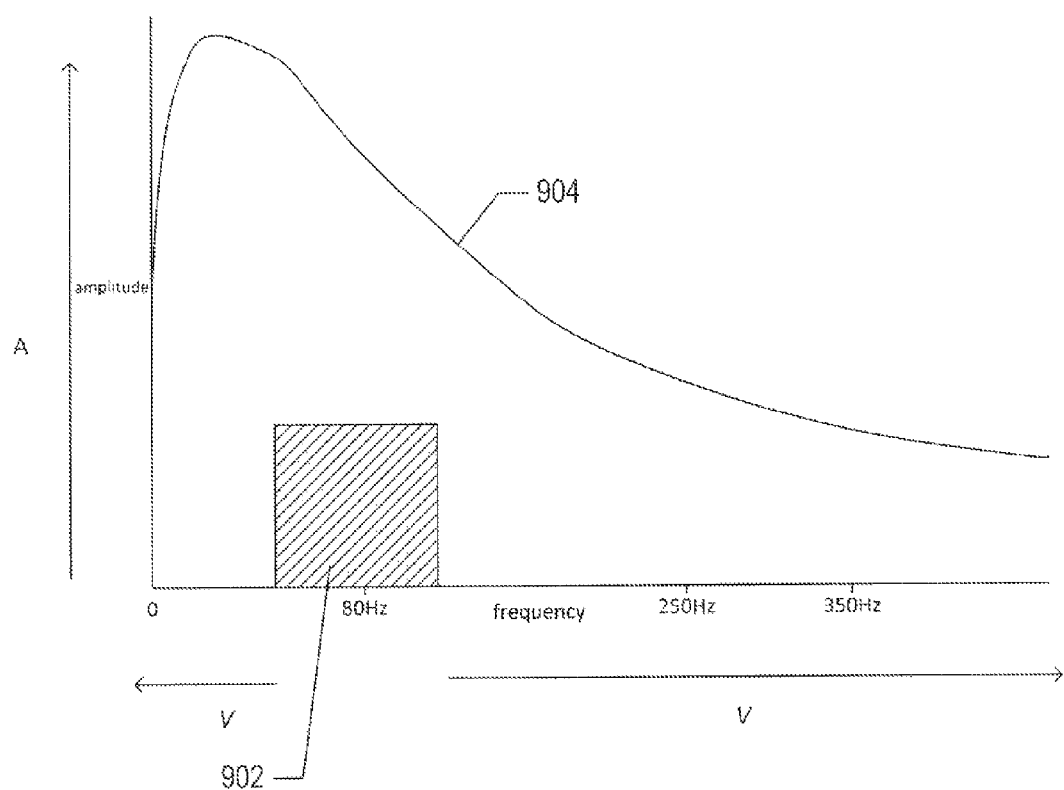
FIG. 9 shows a plot of the amplitude/frequency space and regions in that space that can ,be operationally achieved by unbalanced electrical motors and by LRVMs that represent embodiments of the current application.

FIG. 8 represents the range of frequencies and vibrational forces that can be achieved by different implementations of LRVM and LRVM control programs that represent embodiments of the current application. FIG. 8 has the same axes as the graph shown in FIG. 3. However, unlike FIG. 3, FIG. 8 includes many different curves, such as curve 802, each representing the vibrational forces and frequencies that can be obtained from a particular LRVM implementation. Again, the LRVMs that represent embodiments of the current application generally have a resonant frequency that is characteristic of the geometry and weights of various components of the LRVM, and each LRVM is naturally operated at a frequency close to this resonant frequency in order to achieve maximum vibrational force. Thus, rather than being restricted, over all possible implementations, to a relatively narrow range of frequencies and vibrational forces, as in the case of unbalanced electrical motors, LRVMs that represent embodiments of the current application can be designed and implemented to produce desired vibrational forces over a wide range of vibrational frequencies, and desired vibrational frequencies over a wide range of desired vibrational forces. The contrast is perhaps best seen in FIG. 9. FIG. 9 shows a plot of the amplitude/frequency space and regions in that space that can be operationally achieved by unbalanced electrical motors and by LRVMs that represent embodiments of the current application. Unbalanced electric motors can be implemented to produce amplitude/frequency combinations, roughly within the cross-hatched square region 902 within amplitude/frequency space. By contrast, LRVMs can be designed and implemented to produce amplitude/frequency combinations underlying curve 904. Thus, LRVMs can achieve much higher operational frequencies and much lower operational frequencies than can be practically obtained by unbalanced electric motors, and can produce much higher amplitudes and vibrational forces than can be achieved by relatively low-powered unbalanced electrical motors used in hand-held appliances and other commonly encountered devices and systems. Furthermore, when larger vibrational forces are needed, balanced electrical motors are generally impractical or infeasible, due to the destructive forces produced within the electrical motors. In general, a single implemented LVM or LVRM can access a much larger region of amplitude/frequency space than currently available vibration modules, which generally operate at fixed amplitudes and/or fixed frequencies, as further discussed below.

Figure 10:
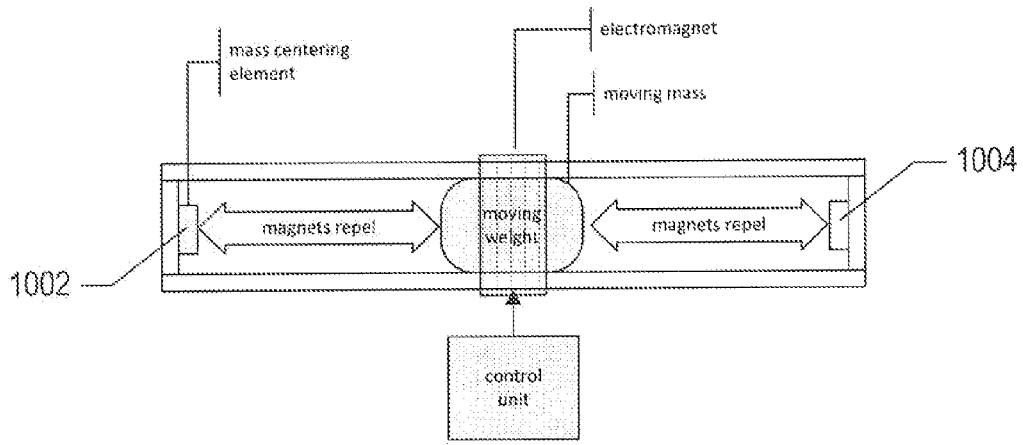
FIGS. 10-17 show a variety of different alternative implementations of LRVMs that represent different embodiments of the current application.

FIGS. 10-17 show a variety of different alternative implementations of LRVMs that represent different embodiments of the current application. FIG. 10 provides a schematic illustration of an LRVM similar to that discussed above with reference to FIG. 4A. Note that, in place of the end magnets 1002 and 1004, mechanical springs may alternatively be used. These may be traditional helical springs made. from metal or springs made from a compressible and durable material or mechanical device that seeks to restore its initial shape when depressed or compressed. Note that the weight and chamber may be cylindrical, in cross section, as discussed above with reference to FIG. 4A, or may have other shapes, including rectangular or hexagonal cross-sections.

Figure 11:
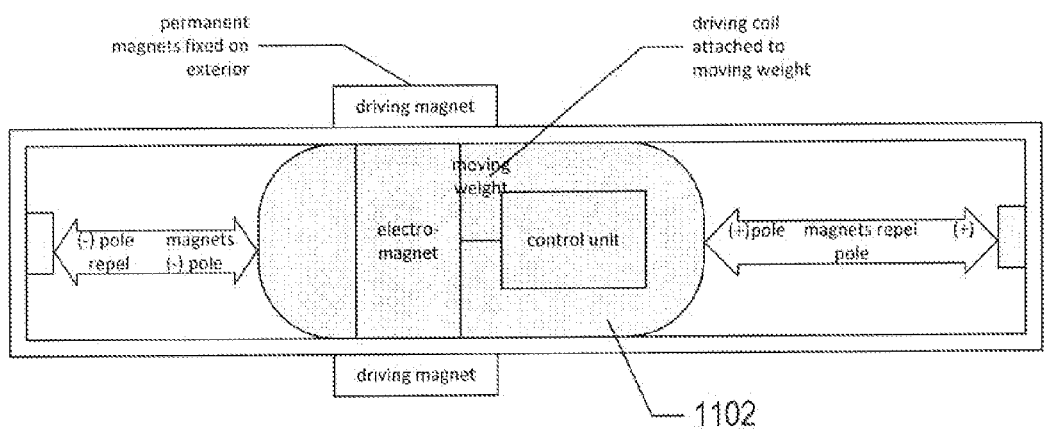

FIG. 11 shows a similar implementation in which the control unit and power supply are incorporated into the moving mass 1102. In this implementation, the relative masses of the moving mass 1102 and remaining components of the LRVM is maximized, thus maximizing the vibrational forces produced at a given level of power consumption.

Figure 12:
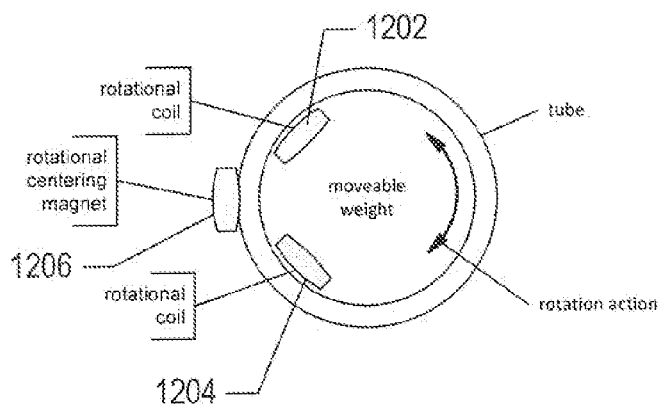

FIG. 12 shows yet an alternative LRVM an implementation of the linear-resonant vibration module to which current application is directed. In this alternative implementation, additional coils 1202 and 1204 are incorporated in the moving mass, and a centering magnet or coil 1206 is positioned in a fixed location on the housing so that, when the direction of the current applied to the coils 1202 and 1204 is alternated, an oscillating rotational force is generated to cause the movable weight to oscillate both in a plane perpendicular to the axis of the chamber as well as linearly oscillating the direction of the chamber.

Figure 13:
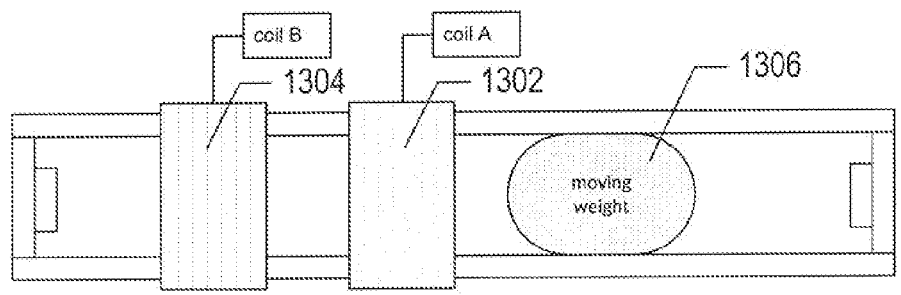

FIG. 13 illustrates an embodiment in which multiple electromagnetic coils are employed. In FIG. 13, two coils 1302 and 1304 are placed in two different positions on the housing. The first coil 1302 may be used to drive linear oscillation of the moving mass 1306, while the second coil may be activated in order to shorten the length of the chamber within which the moving mass linearly oscillates, essentially serving as a second repelling magnet. In this implementation of the LRVM, the moving mass may linearly oscillate with at least two different amplitudes, depending on whether or not the second coil 1304 is activated to repel the moving mass. Additionally more complex patterns of current reversal in the two coils can be employed to produce complex multi-component vibrational modes of the moving mass.

When the housing is fully enclosed, air within the chamber serves to dampen oscillation of the moving mass. This dampening may be minimized by providing channels, on the sides of the moving mass, to allow air to pass from one side of the moving mass to the other, by channels through the moving mass, or by providing openings in the housing to allow air to be forced from the housing and drawn into the housing. Additionally, different fluids or liquids may be employed within the chamber to change the dampening effect produced by displacement of the fluids and gasses as the moving mass linearly oscillates.

Figure 14:
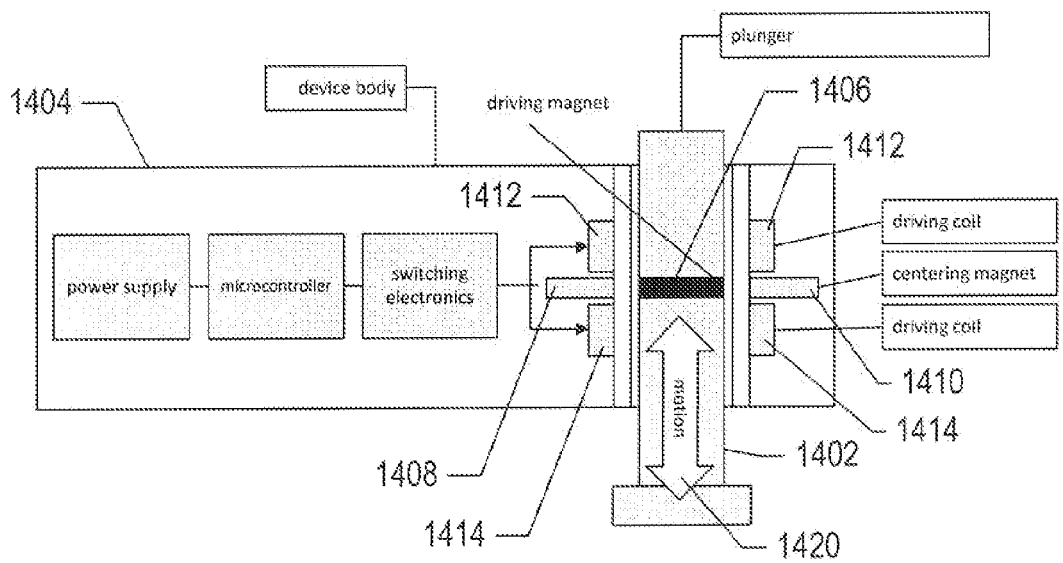

FIG. 14 illustrates an alternative LRVM an implementation of the linear-resonant vibration module to which current application is directed in which a plunger linearly oscillates to produce a vibration. The plunger 1402 is slideably contained within a moveable-component track orthogonal to a long axis of the main housing 1404 of the LRVM that includes the power supply, microcontroller, and other control components. The plunger is girdled by, or includes, a driving magnet 1406 that is attracted to, and seeks to be positioned in alignment with, a centering magnet 1408 mounted within the housing. Applying current to one of two driving coils 1412 and 1414 forces the driving magnet away from the equilibrium position shown in FIG. 14. By rapidly switching the direction of current applied to the driving coils, the microcontroller can control the plunger to linearly oscillate in an up-and-down fashion, as indicated by arrow 1420.

Figure 15:
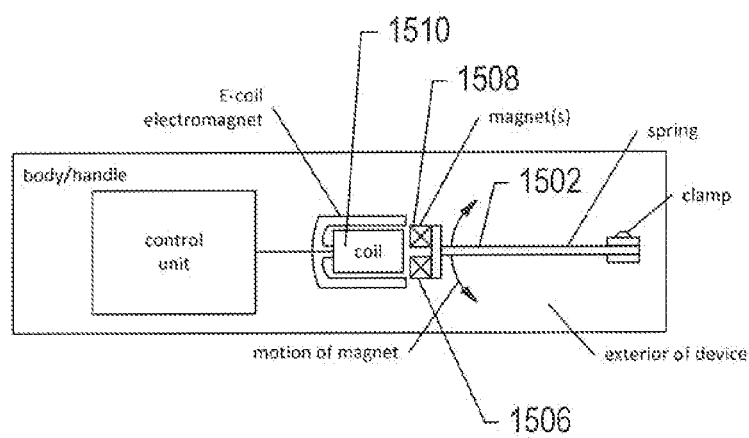

FIG. 15 shows yet another LRVM an implementation of the linear-resonant vibration module to which current application is directed. In this an implementation of the linear-resonant vibration module to which current application is directed, a spring-like member 1502 is clamped at one end 1504 to the housing. Driving magnets 1506 and 1508 are fixed to the spring-like member 1502, and when current is rapidly reversed in a coil 1510, the spring-like member 1502 is induced to vibrate at a relatively high frequency.

Figure 16:
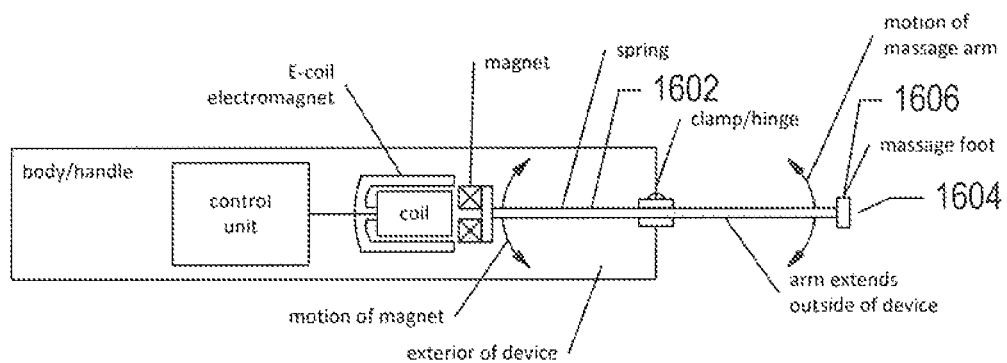

FIG. 16 shows an alternative an implementation of the linear-resonant vibration module to which current application is directed similar to the embodiment shown in FIG. 15. In this embodiment, the spring member 1602 is extended to provide an external massage arm 1604 that extends out from the housing to provide a linearly oscillating massage-foot member 1606 for massaging human skin or some other substrate, depending on the application.

Figure 17:
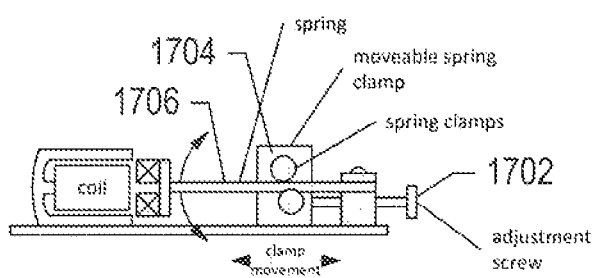

FIG. 17 shows a mechanical vibration adjustment feature that can be added to either of the embodiments shown in FIGS. 15 and 16. An adjustment screw 1702 can be manipulated to alter the position of a movable spring clamp 1704 that acts as a movable clamping point for the spring-like member 1706. Moving the movable spring clamp 1704 leftward, in FIG. 17, shortens the length of the spring-like member and thus tends to increase the resonant frequency at a particular power-consumption level. Conversely, moving the movable spring clamp rightward, in FIG. 17, lengthens the spring-like member and decreases the vibrational frequency.

Figure 18:
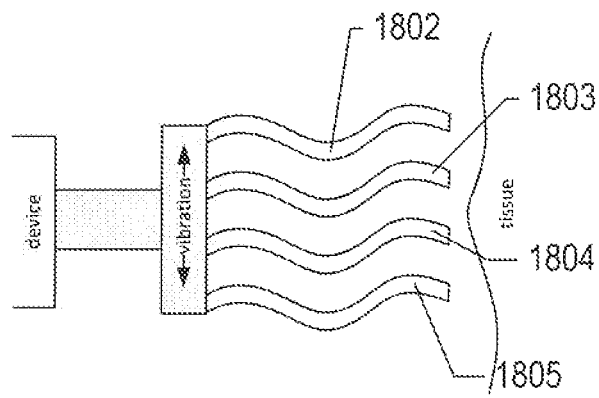
FIG. 18 illustrates an enhancement of an implementation of the linear-resonant vibration module to which current application is directed shown in FIG. 16.

FIG. 18 illustrates an enhancement of an implementation of the linear-resonant vibration module to which current application is directed shown in FIG. 16. In this embodiment, the massage foot is enhanced to include elastomer bristles 1802-1805 to transfer the linear oscillation of the massage foot to human skin or another substrate. The elastomeric bristles, or pad or brush comprising numerous elastomeric bristles, allow transmission of vibration to a surface even at low operational powers, when a rigid or even semi-compliant massage foot would instead simply stop moving for inability to overcome frictional forces.

As discussed above with reference to FIG. 6, including a processor or microcontroller within a linear-resonant vibration module allows for a very large number of different processor-controlled vibration patterns and modes to be exhibited by the linear-resonant vibration module. As discussed above, processor control along with a linear-resonant-vibration-module architecture allows the processor-controlled device to access a much larger portion of a total amplitude/frequency space than can be accessed by currently available unbalanced-electric-motor vibration devices. Thus, processor-controlled linear-resonant vibration modules provide a large increase in functionality with respect to currently available vibration modules. There is, however, a relatively large gap in functionality between processor-controlled linear-resonance vibration modules and currently available unbalanced-electric-motor vibration modules that can be bridged by linear vibration modules that lack processor or microprocessor control.

Figure 19:
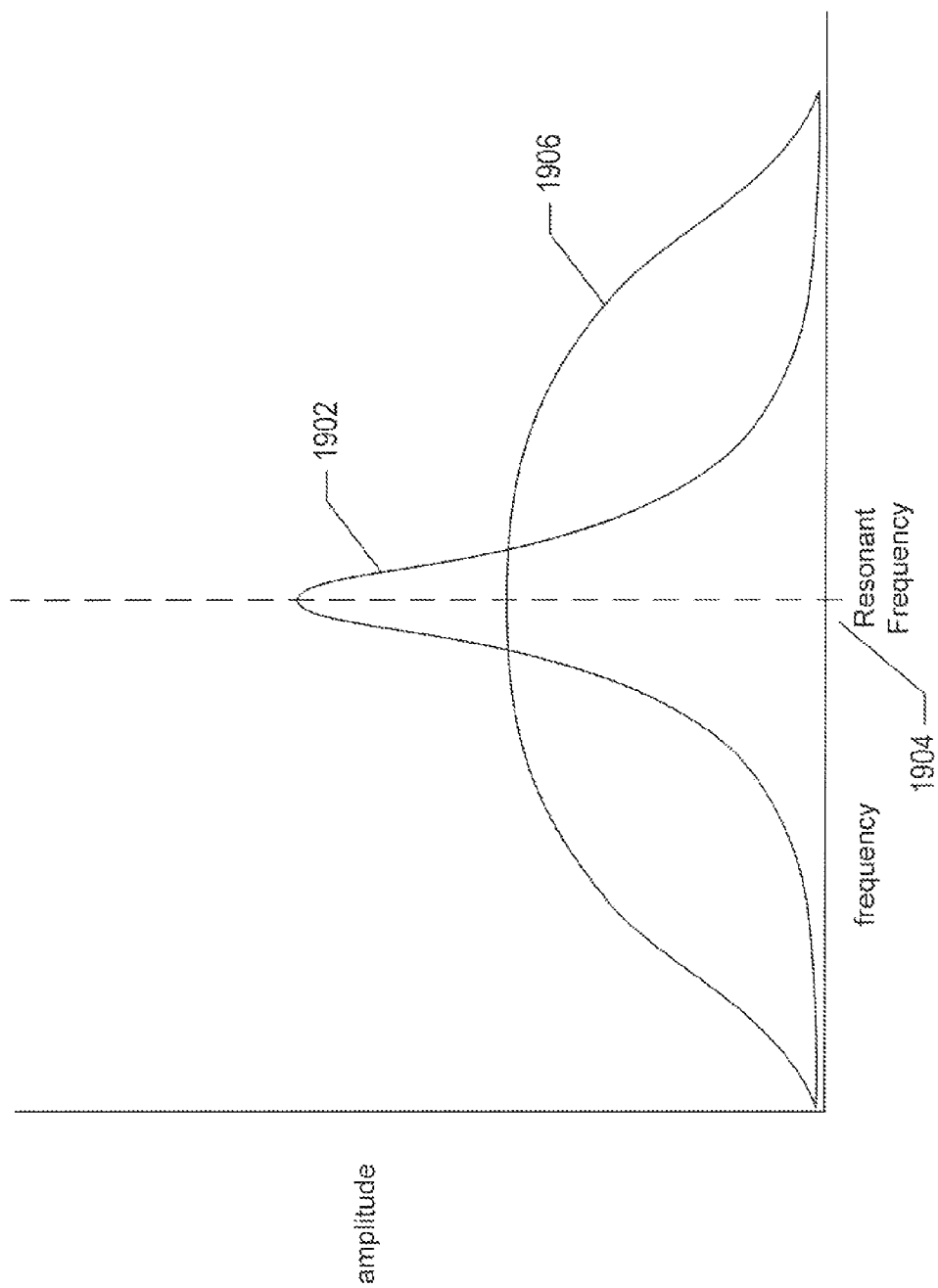
FIG. 19 illustrates plots of amplitude versus frequency for a high-Q and a low-Q vibration device.

When discussing vibration modules, electric motors, and other oscillating devices, it is common to use the phrase "Q factor," or "quality factor," to refer to a quality or characteristic of an oscillating device. The Q factor refers to the level of dampening of an oscillator or, in other words, a ratio of the energy stored in the oscillator or resonator to the energy needed to be supplied to the oscillator or resonator during each oscillation cycle in order to maintain a constant oscillation amplitude. FIG. 19 illustrates. plots of amplitude versus frequency for a high-Q and a low-Q vibration device. The curve 1902 for a high-Q device generally has a narrower and taller amplitude peak about a resonant frequency 1904 or, in certain cases, several relatively tall, narrow peaks about several resonant frequencies, while a low-Q device exhibits a much broader, but lower-amplitude amplitude-versus-frequency curve 1906. A linear-resonant vibration module, when controlled to vibrate at a resonant frequency, as described above, generally operates as a high-Q device. However, when controlled by user input or programmatically to vibrate at non-resonant frequencies, the linear-resonant vibration module may instead operate as a low-Q device. Linear vibration modules and other types of vibration modules that lack feedback control generally do not operate at resonant frequencies for extended periods of time, and thus tend to be low-Q devices.

Unbalanced-electric-motor vibration modules and even currently available resonating motors generally operate at either a fixed amplitude or a fixed frequency. For example, unbalanced-electric-motor vibration modules are generally operated at high revolutions per minute ("RPM") to create any vibration, and once operating at a given speed have a relatively fixed amplitude determined. by the geometry of the unbalanced weight and rotor shaft. Other types of vibration modules that are currently available include resonating motors, such as the vibration modules found in certain electric toothbrushes, but these resonating motors operate only at a fixed frequency. In both cases, only a very limited portion of the amplitude/frequency space can be accessed by essentially fixed-amplitude or fixed-frequency vibration modules.

Alternative, lower-cost linear-vibration modules can be designed and manufactured by replacing the processor or microcontroller (602 in FIG. 6) of the above-described linear-resonant vibration module with a simpler oscillator circuit with additional control circuitry. The H switch (620 in FIG. 6) can be controlled by an oscillating current input rather than digital outputs from a microprocessor. Replacing the CPU or microprocessor with an oscillator and additional simple control circuitry produces a less functional, generally lower-Q, but also more economical linear vibration module that, although lacking the extremely broad range of vibration patterns and modes available to processor or microprocessor-controlled vibration modules, can nonetheless access a much larger portion of the amplitude/frequency space than can be accessed by currently available fixed-amplitude or fixed-frequency vibration modules.

In one example implementation of an oscillator-controlled linear vibration module, a variable-frequency oscillator circuit can be controlled by user input to drive the H switch or other H-switch-like circuit to operate the linear vibration module at different frequencies. A user is provided an input feature that allows the user to directly adjust the frequency of the variable oscillator and thus the vibrational frequency produced by the linear vibration module. The user is additionally provided with an input feature to allow the user to control the current or duty cycle used to drive the linear vibration module and to thus increase and decrease the amplitude of vibration produced by the linear vibration module. Thus, a user can control both the frequency of vibration and the amplitude of vibration.

Figure 20:
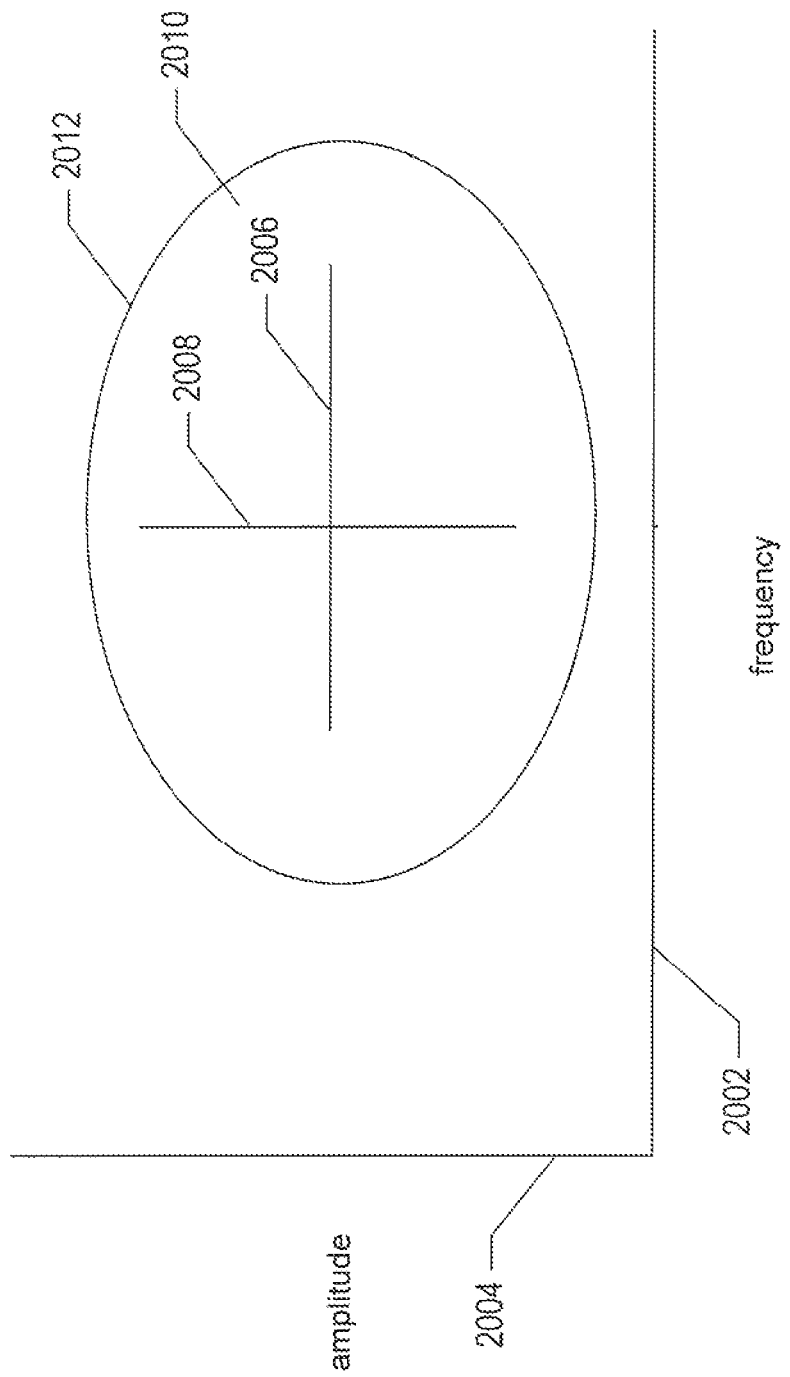
FIG. 20 illustrates portions of amplitude/frequency space accessible to various types of vibration modules.

FIG. 20 illustrates portions of amplitude/frequency space accessible to various types of vibration modules. In FIG. 20, frequency is plotted with respect to a horizontal axis 2002 and amplitude is plotted with respect to a vertical axis 2004. The plane indexed by these axes represents the amplitude/frequency space, portions of which can be accessed by a given type of vibration module. The above-described unbalanced-electric-motor vibrators are essentially constant-amplitude devices, and can thus access some range of frequencies at a fixed amplitude, represented by line segment 2006 in FIG. 20. Different unbalanced-electric-motor vibrators may have different fixed amplitudes, but, for a given device, the portion of amplitude/frequency space that they can access can generally represented by a line segment or high-aspect-ratio rectangle oriented orthogonally to the amplitude axis. The resonant-motor vibration devices, which each operates at a fixed frequency, can generally access a range of amplitudes at the. fixed frequency, as represented by line segment 2008 in FIG. 20. By contrast, a linear vibration. module user-input-controlled variable frequency and variable amplitude can access a two-dimensional subspace within the amplitude/frequency space, such as the region 2010 within elliptical boundary 2012 in FIG. 20. Clearly, a linear vibration module with user-controlled variable amplitude and variable frequency can provide a much broader range of amplitude/frequency combinations than currently available vibration modules. A processor or microcontroller-controlled linear-resonant vibration module, as discussed above with reference to FIGS. 4A-18, can access an even larger region of amplitude/frequency space that includes region 2010 with a subspace.

Figure 21:
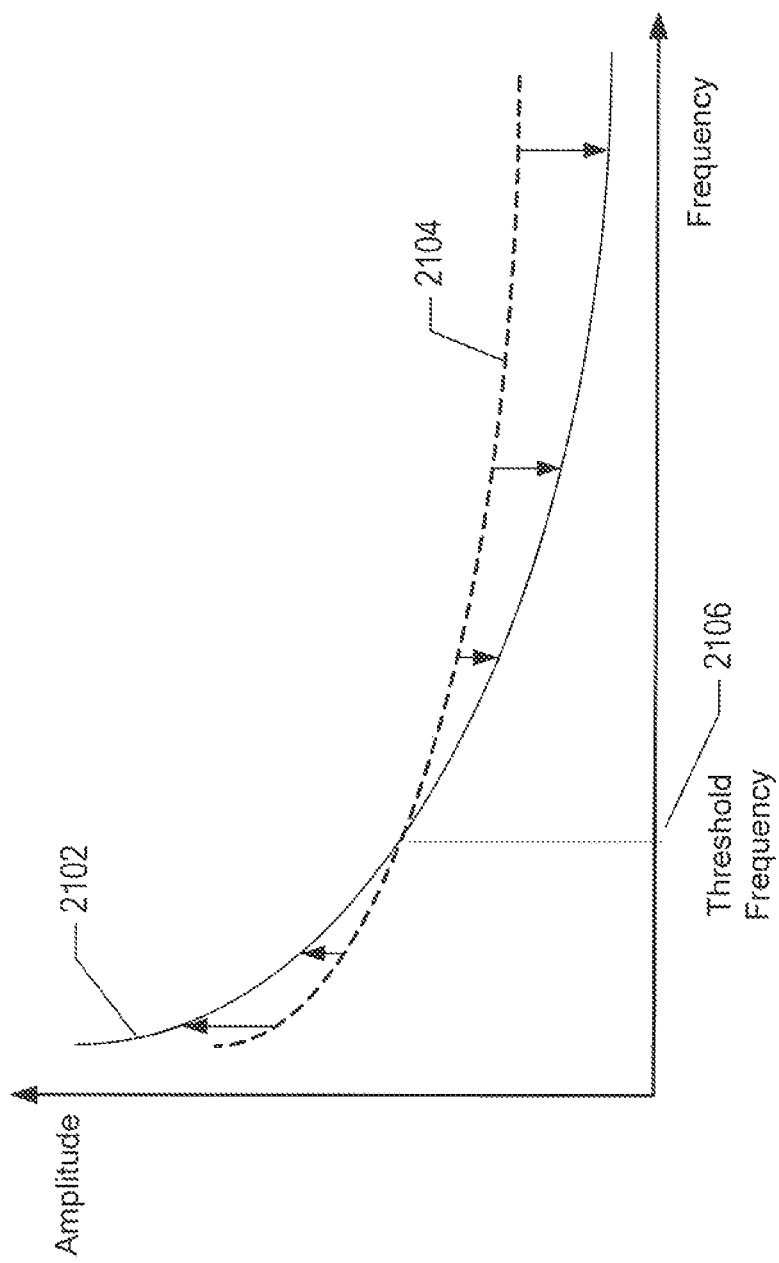
FIG. 21 illustrates the dependence between frequency and amplitude in a low-Q linear vibration module as well as a modified dependence that can be obtained by control circuitry.

In certain low-Q linear vibration modules that lack microprocessor or microcontroller control, for any given frequency of operation, the amplitude tends to increase with decreasing frequency of operation. FIG. 21 illustrates the dependence between frequency and amplitude in a low-Q linear vibration module as well as a modified dependence that can be obtained by control circuitry. In FIG. 21, solid curve 2102 represents the dependence of amplitude on frequency for a low-Q linear vibration module without additional control circuitry. As the frequency decreases, the amplitude begins to steeply and non-linearly increase. In certain applications, a constant or relatively constant amplitude is desired over a broad range of frequencies. A low-Q linear vibration module without microprocessor or microcontroller control can obtain a more constant amplitude over a broader range of frequencies by adjusting the current or duty cycle downward at lower frequencies. For example, as shown by dashed curve 2104 in FIG. 21, the control circuitry can be implemented to detect when user-input-controlled operational frequency of a linear vibration module is below a threshold frequency 2106, at which point control circuitry can lower the driving current or duty cycle to decrease the vibrational amplitude when the linear vibration module is operating at frequencies below the threshold frequency. Thus, dashed curve 2104 is the sum of a lowered-current low-frequency curve and a higher-current high-frequency curve, with the curves joined at the threshold frequency. Alternatively, control circuitry can be implemented to continuously adjust the current or duty cycle lower as the frequency of operation is lowered by user input in order to even further flatten the amplitude-versus-frequency curve for the linear vibration module. In either case, a user may override these automatic adjustments by increasing the amplitude at lower operational frequencies via user input to an amplitude-control user-input feature.

Returning to microprocessor-controlled or microcontroller-controlled linear vibration modules, it should be noted that processor or microprocessor control allows for an essentially limitless number of different vibrational behaviors and modes to be configured by software or firmware design, by user input, or by a combination of software or firmware design and user input. Rather simple enhancements can produce interesting enhanced vibrational behavior. As one example, a microprocessor-controlled or microcontroller-controlled linear vibration module can be programmed to drive the device simultaneously at two different frequencies. FIGS. 22A-23 illustrate interesting vibrational modes produced by driving a linear-resonant vibration module simultaneously at two different frequencies. FIG. 22A shows a vibration mode of a linear vibration module driven at a frequency of 25 Hz. In a one-second duration of time, plotted with respect to horizontal axis 2202, 25 cycles, each including a positive and negative amplitude peak, such as positive amplitude peak 2204 and negative amplitude peak 2206, occur. At a constant 25 Hz frequency of operation, the positive peaks and negative peaks are evenly spaced. FIG. 22B illustrates a vibration mode of the linear vibration module driven at a primary operational frequency of 25 Hz with an added modulating 1 Hz operational frequency. Driving the linear vibration module by both a primary and a modulating frequency produces low-frequency pulses of high-frequency vibration. FIG. 23 illustrates a different complex vibrational mode in which two driving frequencies combine to produce a lower-frequency beat-wave form. The vibrational mode illustrated in FIG. 23 is produced by a primary driving frequency of 25 Hz, as in FIG. 22A, with a second driving frequency of 20 Hz. By varying the number, relative amplitudes, and frequencies of two or more driving signals, a microprocessor-controlled or microcontroller-controlled linear-resonance vibration module can be controlled to produce any number of complex vibrational patterns and modes, including periodic modes, modes with multiple different periods, various modulated vibration modes, and even fully a periodic vibration modes that do not repeat time.

In a linear-resonant vibration module, discussed above, by maintaining device operation at a resonant frequency, the linear-resonant vibration module is a relatively high-Q device, and generally operates more efficiently to produce a given vibration amplitude than a low-Q device, such as a linear vibration module lacking microprocessor or microcontroller control and operating at a frequency/amplitude setting that does not correspond to a natural vibration mode of the device. There are, in addition, many other ways to increase the energy efficiency of a linear vibration module.

Figure 24A:
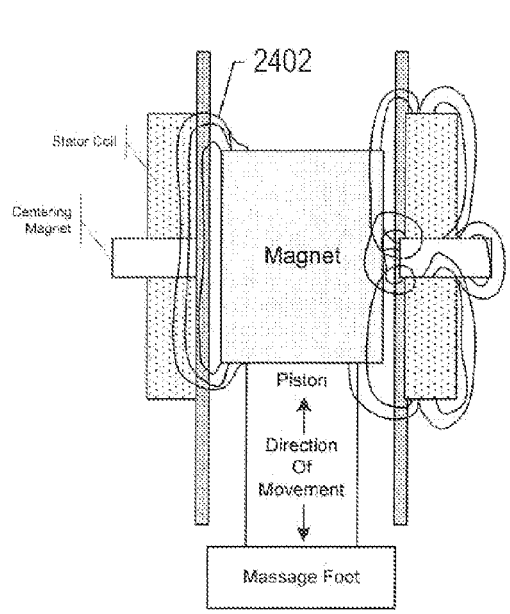
FIGS. 24A-25 illustrate incorporation of paramagnetic flux paths into a linear vibration module.
Figure 24B:
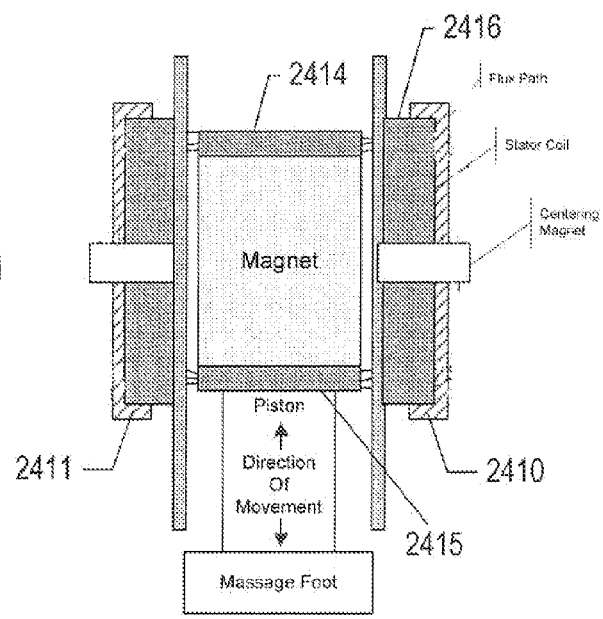
Figure 25:
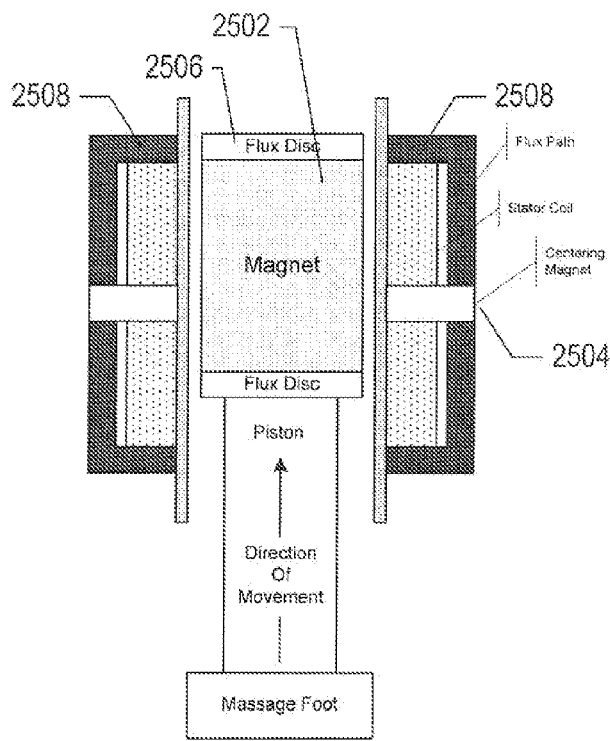

FIGS. 24A-25 illustrate incorporation of paramagnetic flux paths into a linear vibration module. In free air, magnetic field lines radiate outwards in arcs from the north pole to the south pole of a magnet, completing a magnetic circuit. Free air can be considered to be analogous to a resistor in an electric circuit and increases the resistance, or magnetic reluctance, of a magnetic circuit and reduces and the flux of the magnetic field. A magnetic field seeks out the path of least resistance, and changes direction, when necessary, to maximize flux between the two magnetic poles. When introduced into a magnetic field, paramagnetic materials provide a lower-resistance path for magnetic flux, providing that they have adequate permeability and size to avoid saturation. Paramagnetic materials of appropriate permeability and size reduce the reluctance of a magnetic circuit and can therefore allow a magnetic field to more efficiently perform more work.

FIG. 24A shows a linear vibration module without paramagnetic flux paths. On the left-hand side of FIG. 24A, the magnetic field lines 2402 of the moving magnet are shown. A significant portion of the magnetic field lines can be seen to pass through air. FIG. 248 shows a linear vibration module with added paramagnetic flux paths. These include flux paths around the stator coils 2410-2411 as well as flux-path disks 2414-2415 at the ends of the cylindrical magnet 2416 within the linear vibration module. As can be seen by comparing FIG. 24B to FIG. 24A, only tiny portions of the flux lines in FIG. 24B pass through free air, in contrast to the relatively large portions of flux lines that pass through free air in FIG. 24A. Thus, addition of paramagnetic flux paths to a linear vibration module in order to decrease the portion of magnetic field lines passing through free air provides a more efficient linear vibration module.

FIG. 25 illustrates flux-path magnetic stops incorporated within a linear vibration module to which the current application is directed. During operation of the linear vibration module, and without the influence of any external force on the piston, the mid-plane of the shuttle magnet 2502 oscillates about the fixed mid-plane of the centering magnet 2504. When the device encounters a resisting normal force on the end of the piston, the shuttle magnet biases into the motor and oscillates about a datum offset from the fixed mid-plane of the centering magnet. When the resisting force is greater than the electromagnetic force generated by the motor, the piston assembly continues to be driven into the bore until the flux disc 2506 is in line with the return lip 2508 of the flux path. En this position, the air gap of the magnetic circuit is reduced due to the proximity of the flux disc to the return lip. Maximum magnetic flux flow is achieved between these two components in a radial direction. Additional external axial force is required to force the piston assembly to move beyond this limit, effectively producing a magnetic stop. This effect also prevents the piston from being ejected from the motor at high power and low frequency settings at which the piston carries significant momentum.

Although the present invention has been described in terms of particular embodiments, it is not intended that the invention be limited to these embodiments. Modifications will be apparent to those skilled in the art. For example, as discussed above, LRVMs can be designed to produce desired vibrational amplitudes and frequencies over a wide region of amplitude/frequency space by varying various different design parameters and characteristics, including the amplitude of a moving mass that linearly oscillates within the LRVM, altering the dimensions of the LRVM and internal components of the LRVM, altering the weight of the moving mass and other components of the LRVM, changing the ratio of the moving mass to the ratio of the remaining components of the LRVM, increasing or decreasing the number of turns in the coil or coils used to drive linear oscillation, increasing or decreasing the current supply to the coils, altering the dampening produced by displacement of fluid or gas by the moving mass within the LRVM as well as by various additional frictional forces, altering the strength of the end-cap magnets or mechanical springs used to facilitate reversal of direction of the moving mass, and by changing any of various additional parameters and characteristics. Any of various different microprocessors and other microcontrollers can be used in alternative embodiments of the LRVM, as well as different power supplies, current-switching devices, and other components. The control program executed by the LRVM can be implemented in many different ways by varying any of many different design parameters, including programming language, control structures, data structures, modular organization, and other such design parameters. The components of the LRVM, including the housing, moving mass, fixed magnets, and electromagnets, can be fashioned from many different types of materials, from polymers and plastics to metals and alloys in various composite materials. LRVMs may contain one, two, or more electromagnets and/or permanent magnets in order to produce linear oscillation of a moving mass or spring-like mass, and various different control programs can be implemented to produce many different types of single-component and multi-component vibrational modes, some of which may regularly or erratically change, over time, to produce a wide variety of different types of vibrational characteristics. An additional housing made from a material with a relatively large Magnetic permeability can be added to various embodiments of the current application to concentrate and increase the linear magnetic forces produced by the various coils.

The foregoing description, for purposes of explanation, used specific nomenclature to provide a thorough understanding of the invention. However, it will be apparent to one skilled in the art that the specific details are not required in order to practice the. invention. The foregoing descriptions of specific embodiments of the present. invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A linear vibration module comprising:
   a housing;
   a moveable component;
   a power supply;
   user-input features;
   a driving component that drives the moveable component in each of two opposite directions within the housing;
   a control component that controls supply of power from the power supply to the driving component to cause the moveable component to oscillate at a frequency and an amplitude specified by user input received from the user-input features; and
   flux paths comprising a paramagnetic material that is shaped and positioned to reduce the reluctance of one or more magnetic circuits within the linear vibration module.

2. A linear vibration module comprising:
   a housing;
   a moveable component;
   a power supply;
   user-input features;
   a driving component that drives the moveable component in each of two opposite directions within the housing; and
   a control component that controls supply of power from the power supply to the driving component to cause the moveable component to oscillate at a frequency and an amplitude specified by user input received from the user-input features,
     wherein the control component drives simultaneous oscillation of the moveable component at two or more frequencies to generate complex vibration modes.

3. The linear vibration module of claim 2 wherein the complex vibration modes include:
   a primary oscillation frequency modulated by a modulating oscillation frequency;
   a beat frequency; and
   an aperiodic oscillation waveform.

4. A linear vibration module comprising:
   a housing;
   a moveable component;
   a power supply;
   user-input features;
   a driving component that drives the moveable component in each of two opposite directions within the housing; and
   a control component that controls supply of power from the power supply to the driving component to cause the moveable component to oscillate at a frequency and an amplitude that are independently specified by user input received from the user-input features.

5. A linear vibration module comprising:
   a housing;
   a moveable component;
   a power supply;
   user-input features;
   a driving component that drives the moveable component in each of two opposite directions within the housing;
   a control component that controls supply of power from the power supply to the driving component to cause the moveable component to oscillate at a frequency and an amplitude specified by user input received from the user-input features; and
   elastomeric bristles used to transfer vibration from the linear vibration module to a surface.

* * * * *